(12) United States Patent
Hickerson et al.

(10) Patent No.: US 7,261,542 B2
(45) Date of Patent: Aug. 28, 2007

(54) APPARATUS FOR THREE DIMENSIONAL PRINTING USING IMAGE LAYERS

(75) Inventors: Kevin P. Hickerson, Altadena, CA (US); Bryan Bedal, Santa Clarita, CA (US); Richard J. Diephuis, Pasadena, CA (US)

(73) Assignee: Desktop Factory, Inc., Pasadena, CA (US)

( * ) Notice: Subject to any disclaimer, the term of this patent is extended or adjusted under 35 U.S.C. 154(b) by 132 days.

(21) Appl. No.: 11/078,894

(22) Filed: Mar. 11, 2005

(65) Prior Publication Data

US 2005/0208168 A1   Sep. 22, 2005

Related U.S. Application Data

(60) Provisional application No. 60/554,251, filed on Mar. 18, 2004.

(51) Int. Cl.
*B28B 1/16*   (2006.01)

(52) U.S. Cl. .................. 425/174.4; 425/375; 264/308; 264/401

(58) Field of Classification Search ............ 425/174.4, 425/375; 264/308, 401; 101/417, 424.1
See application file for complete search history.

(56) References Cited

U.S. PATENT DOCUMENTS

| | | |
|---|---|---|
| 473,901 A | 5/1892 | Blanther |
| 774,549 A | 11/1904 | Baese |
| 1,516,199 A | 11/1924 | Monteath |
| 2,015,457 A | 9/1935 | Morioka |
| 2,189,592 A | 2/1940 | Perera |
| 2,350,796 A | 6/1944 | Morioka |
| 2,775,758 A | 12/1956 | Munz |
| 3,264,385 A | 8/1966 | Reed |
| 3,428,503 A | 2/1969 | Beckerle |
| 3,751,827 A | 8/1973 | Gaskin |
| 3,866,052 A | 2/1975 | Dimatteo |
| 3,932,923 A | 1/1976 | DiMatteo |
| 4,001,069 A | 1/1977 | DiMatteo |
| 4,041,476 A | 8/1977 | Swainson |
| 4,078,229 A | 3/1978 | Swainson et al. |
| 4,132,575 A | 1/1979 | Suzuki et al. |
| 4,238,840 A | 12/1980 | Swainson |
| 4,247,508 A | 1/1981 | Housholder |

(Continued)

OTHER PUBLICATIONS

US 4,937,420, 06/1990, Deckard (withdrawn)

*Primary Examiner*—Yogendra N. Gupta
*Assistant Examiner*—Maria Veronica Ewald
(74) *Attorney, Agent, or Firm*—Andrew S. Naglestad; Michael Blaine Brook, P.C.

(57) ABSTRACT

A three-dimensional printer adapted to construct three dimensional objects is disclosed. In an exemplary embodiment, the printer includes a first surface adapted to receive a bulk layer of sinterable powder, a polymer such as nylon powder; a radiant energy source, e.g., an incoherent heat source adapted to focus the heat energy to sinter an image from the layer of sinterable powder; and a transfer mechanism adapted to transfer or print the sintered image from the first surface to the object being assembled while fusing the sintered image to the object being assembled. The transfer mechanism is preferably adapted to simultaneously deposit and fuse the sintered image to the object being assembled. The process of generating an image and transferring it to the object being assembled is repeated for each cross section until the assembled object is completed.

53 Claims, 13 Drawing Sheets

U.S. PATENT DOCUMENTS

| | | |
|---|---|---|
| 4,285,754 A | 8/1981 | DiMatteo |
| 4,288,861 A | 9/1981 | Swainson et al. |
| 4,292,724 A | 10/1981 | DiMatteo |
| 4,323,756 A | 4/1982 | Brown et al. |
| 4,333,165 A | 6/1982 | Swainson et al. |
| 4,393,450 A | 7/1983 | Jerard |
| 4,412,799 A | 11/1983 | Gates |
| 4,466,080 A | 8/1984 | Swainson et al. |
| 4,471,470 A | 9/1984 | Swainson et al. |
| 4,515,864 A | 5/1985 | Singer |
| 4,575,330 A | 3/1986 | Hull |
| 4,665,492 A | 5/1987 | Masters |
| 4,707,787 A | 11/1987 | Savit et al. |
| 4,749,347 A | 6/1988 | Valavaara |
| 4,752,352 A | 6/1988 | Feygin |
| 4,752,498 A | 6/1988 | Fudim |
| 4,775,092 A | 10/1988 | Edmonds et al. |
| 4,801,477 A | 1/1989 | Fudim |
| 4,818,562 A | 4/1989 | Arcella et al. |
| 4,830,084 A | 5/1989 | Singer |
| 4,842,186 A | 6/1989 | Doyle et al. |
| 4,844,144 A | 7/1989 | Murphy et al. |
| 4,863,538 A | 9/1989 | Deckard |
| 4,929,402 A | 5/1990 | Hull |
| 4,938,816 A | 7/1990 | Beaman et al. |
| 4,940,412 A | 7/1990 | Blumenthal |
| 4,942,060 A | 7/1990 | Grossa |
| 4,942,066 A | 7/1990 | Fan et al. |
| 4,943,928 A | 7/1990 | Campbell et al. |
| 4,944,817 A | 7/1990 | Bourell et al. |
| 4,945,032 A | 7/1990 | Murphy et al. |
| 4,961,154 A | 10/1990 | Pomerantz et al. |
| 4,996,010 A | 2/1991 | Modrek |
| 4,999,143 A | 3/1991 | Hull et al. |
| 5,009,585 A | 4/1991 | Hirano et al. |
| 5,014,207 A | 5/1991 | Lawton |
| 5,015,312 A | 5/1991 | Kinzie |
| 5,015,424 A | 5/1991 | Smalley |
| 5,017,317 A | 5/1991 | Marcus |
| 5,017,753 A | 5/1991 | Deckard |
| 5,026,146 A | 6/1991 | Hug et al. |
| 5,031,120 A | 7/1991 | Pomerantz et al. |
| 5,038,159 A | 8/1991 | Schmidlin et al. |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,076,869 A | 12/1991 | Bourell et al. |
| 5,079,974 A | 1/1992 | Weiss et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,530 A | 3/1992 | Cohen |
| 5,104,592 A | 4/1992 | Hull et al. |
| 5,106,288 A | 4/1992 | Hughes |
| 5,120,476 A | 6/1992 | Scholz |
| 5,121,329 A | 6/1992 | Crump |
| 5,122,441 A | 6/1992 | Lawton et al. |
| 5,123,734 A | 6/1992 | Spence et al. |
| 5,126,529 A | 6/1992 | Weiss et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,136,515 A | 8/1992 | Helinski |
| 5,137,662 A | 8/1992 | Hull et al. |
| 5,139,338 A | 8/1992 | Pomerantz et al. |
| 5,139,711 A | 8/1992 | Nakamura et al. |
| 5,140,937 A | 8/1992 | Yamane et al. |
| 5,141,680 A | 8/1992 | Almquist et al. |
| 5,143,663 A | 9/1992 | Leyden et al. |
| 5,143,817 A | 9/1992 | Lawton et al. |
| 5,149,548 A | 9/1992 | Yamane et al. |
| 5,151,813 A | 9/1992 | Yamamoto et al. |
| 5,155,321 A | 10/1992 | Grube et al. |
| 5,155,324 A | 10/1992 | Deckard et al. |
| 5,156,697 A | 10/1992 | Bourell et al. |
| 5,156,700 A | 10/1992 | Berman et al. |
| 5,157,423 A | 10/1992 | Zur |
| 5,158,858 A | 10/1992 | Lawton et al. |
| 5,164,128 A | 11/1992 | Modrek et al. |
| 5,167,882 A | 12/1992 | Jacobine et al. |
| 5,169,579 A | 12/1992 | Marcus et al. |
| 5,171,360 A | 12/1992 | Orme et al. |
| 5,171,490 A | 12/1992 | Fudim |
| 5,173,220 A | 12/1992 | Reiff et al. |
| 5,174,843 A | 12/1992 | Natter |
| 5,174,931 A | 12/1992 | Almquist et al. |
| 5,174,943 A | 12/1992 | Hull |
| 5,175,077 A | 12/1992 | Grossa |
| 5,182,055 A | 1/1993 | Allison et al. |
| 5,182,056 A | 1/1993 | Spence et al. |
| 5,182,170 A | 1/1993 | Marcus et al. |
| 5,182,715 A | 1/1993 | Vorgitch et al. |
| 5,183,598 A | 2/1993 | Helle et al. |
| 5,184,307 A | 2/1993 | Hull et al. |
| 5,189,781 A | 3/1993 | Weiss et al. |
| 5,190,624 A | 3/1993 | Reitz |
| 5,192,469 A | 3/1993 | Smalley et al. |
| 5,192,559 A | 3/1993 | Hull et al. |
| 5,194,181 A | 3/1993 | Reitz |
| 5,198,159 A | 3/1993 | Nakamura et al. |
| 5,203,944 A | 4/1993 | Prinz et al. |
| 5,204,055 A | 4/1993 | Sachs et al. |
| 5,204,823 A | 4/1993 | Schlotterbeck |
| 5,207,371 A | 5/1993 | Prinz et al. |
| 5,208,431 A | 5/1993 | Uchiyama et al. |
| 5,209,878 A | 5/1993 | Smalley et al. |
| 5,216,616 A | 6/1993 | Masters |
| 5,217,653 A | 6/1993 | Mashinsky et al. |
| 5,219,712 A | 6/1993 | Evans et al. |
| 5,226,948 A | 7/1993 | Orme et al. |
| 5,232,639 A | 8/1993 | Reitz et al. |
| 5,234,636 A | 8/1993 | Hull et al. |
| 5,236,326 A | 8/1993 | Grossa |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,253,177 A | 10/1993 | Saito et al. |
| 5,256,340 A | 10/1993 | Allison et al. |
| 5,257,657 A | 11/1993 | Gore |
| 5,258,146 A | 11/1993 | Almquist et al. |
| 5,259,593 A | 11/1993 | Orme et al. |
| 5,260,009 A | 11/1993 | Penn |
| 5,263,130 A | 11/1993 | Pomerantz et al. |
| 5,267,013 A | 11/1993 | Spence |
| 5,269,982 A | 12/1993 | Brotz |
| 5,273,691 A | 12/1993 | Hull et al. |
| 5,278,442 A | 1/1994 | Prinz et al. |
| 5,281,789 A | 1/1994 | Merz et al. |
| 5,284,695 A | 2/1994 | Barlow et al. |
| 5,286,573 A | 2/1994 | Prinz et al. |

| Patent | Date | Inventor |
|---|---|---|
| 5,287,435 A | 2/1994 | Cohen et al. |
| 5,289,214 A | 2/1994 | Zur |
| 5,296,062 A | 3/1994 | Bourell et al. |
| 5,296,335 A | 3/1994 | Thomas et al. |
| 5,301,415 A | 4/1994 | Prinz et al. |
| 5,301,863 A | 4/1994 | Prinz et al. |
| 5,303,141 A | 4/1994 | Batchelder et al. |
| 5,304,329 A | 4/1994 | Dickens, Jr. et al. |
| 5,306,446 A | 4/1994 | Howe |
| 5,306,447 A | 4/1994 | Marcus et al. |
| 5,314,003 A | 5/1994 | Mackay |
| 5,316,580 A | 5/1994 | Deckard |
| 5,321,622 A | 6/1994 | Snead et al. |
| 5,337,631 A | 8/1994 | Singer et al. |
| 5,340,090 A | 8/1994 | Orme et al. |
| 5,340,433 A | 8/1994 | Crump |
| 5,340,656 A | 8/1994 | Sachs et al. |
| 5,342,919 A | 8/1994 | Dickens, Jr. et al. |
| 5,344,298 A | 9/1994 | Hull |
| 5,345,391 A | 9/1994 | Hull et al. |
| 5,348,693 A | 9/1994 | Taylor et al. |
| 5,352,310 A | 10/1994 | Natter |
| 5,352,405 A | 10/1994 | Beaman et al. |
| 5,354,414 A | 10/1994 | Feygin |
| 5,355,318 A | 10/1994 | Dionnet et al. |
| 5,358,673 A | 10/1994 | Heller et al. |
| 5,362,427 A | 11/1994 | Mitchell, Jr. |
| 5,370,692 A | 12/1994 | Fink et al. |
| 5,382,308 A | 1/1995 | Bourell et al. |
| 5,385,780 A | 1/1995 | Lee |
| 5,386,500 A | 1/1995 | Pomerantz et al. |
| 5,387,380 A | 2/1995 | Cima et al. |
| 5,389,196 A | 2/1995 | Bloomstein et al. |
| 5,391,072 A | 2/1995 | Lawton et al. |
| 5,391,460 A | 2/1995 | Dougherty et al. |
| 5,393,482 A | 2/1995 | Benda et al. |
| 5,393,613 A | 2/1995 | MacKay |
| 5,398,193 A | 3/1995 | DeAngelis |
| 5,402,351 A | 3/1995 | Batchelder et al. |
| 5,415,820 A | 5/1995 | Furuta et al. |
| 5,418,112 A | 5/1995 | Mirle et al. |
| 5,426,722 A | 6/1995 | Batchelder |
| 5,427,733 A | 6/1995 | Benda et al. |
| 5,429,908 A | 7/1995 | Hokuf et al. |
| 5,430,666 A | 7/1995 | DeAngelis et al. |
| 5,431,967 A | 7/1995 | Manthiram et al. |
| 5,432,045 A | 7/1995 | Narukawa et al. |
| 5,432,704 A | 7/1995 | Vouzelaud et al. |
| 5,433,280 A | 7/1995 | Smith |
| 5,435,902 A | 7/1995 | Andre, Sr. |
| 5,437,820 A | 8/1995 | Brotz |
| 5,437,964 A | 8/1995 | Lapin et al. |
| 5,447,822 A | 9/1995 | Hull et al. |
| 5,460,209 A | 10/1995 | Jandura et al. |
| 5,460,758 A | 10/1995 | Langer et al. |
| 5,460,851 A | 10/1995 | Jenkins |
| 5,474,719 A | 12/1995 | Fan et al. |
| 5,476,222 A | 12/1995 | Singer et al. |
| 5,481,470 A | 1/1996 | Snead et al. |
| 5,482,659 A | 1/1996 | Sauerkoefer |
| 5,490,882 A | 2/1996 | Sachs et al. |
| 5,490,962 A | 2/1996 | Cima et al. |
| 5,491,643 A | 2/1996 | Batchhelder |
| 5,495,328 A | 2/1996 | Spence et al. |
| 5,496,682 A | 3/1996 | Quadir et al. |
| 5,496,683 A | 3/1996 | Asano |
| 5,500,069 A | 3/1996 | Ogue et al. |
| 5,501,824 A | 3/1996 | Almquist et al. |
| 5,502,476 A | 3/1996 | Neal et al. |
| 5,503,785 A | 4/1996 | Crump et al. |
| 5,503,793 A | 4/1996 | Uchinono et al. |
| 5,506,087 A | 4/1996 | Lapin et al. |
| 5,506,607 A | 4/1996 | Sanders, Jr. et al. |
| 5,510,066 A | 4/1996 | Fink et al. |
| 5,510,226 A | 4/1996 | Lapin et al. |
| 5,512,162 A | 4/1996 | Sachs et al. |
| 5,514,232 A | 5/1996 | Burns |
| 5,514,378 A | 5/1996 | Mikos et al. |
| 5,514,519 A | 5/1996 | Neckers |
| 5,514,521 A | 5/1996 | Kobayashi |
| 5,516,586 A | 5/1996 | Singer et al. |
| 5,518,060 A | 5/1996 | Cleary et al. |
| 5,518,664 A | 5/1996 | Reitz |
| 5,518,680 A | 5/1996 | Cima et al. |
| 5,519,816 A | 5/1996 | Pomerantz et al. |
| 5,522,447 A | 6/1996 | Sandstrom et al. |
| 5,525,051 A | 6/1996 | Takano |
| 5,527,877 A | 6/1996 | Dickens, Jr. et al. |
| 5,529,471 A | 6/1996 | Khoshevis |
| 5,529,473 A | 6/1996 | Lawton et al. |
| 5,530,221 A | 6/1996 | Benda et al. |
| 5,534,104 A | 7/1996 | Langer et al. |
| 5,536,467 A | 7/1996 | Reichle et al. |
| 5,540,871 A | 7/1996 | Uchida et al. |
| 5,545,367 A | 8/1996 | Bae et al. |
| 5,546,313 A | 8/1996 | Masters |
| 5,549,697 A | 8/1996 | Caldarise |
| 5,554,336 A | 9/1996 | Hull |
| 5,554,415 A | 9/1996 | Turchan et al. |
| 5,555,176 A | 9/1996 | Menhennett et al. |
| 5,555,481 A | 9/1996 | Rock et al. |
| 5,556,590 A | 9/1996 | Hull |
| 5,559,592 A | 9/1996 | Larson et al. |
| 5,559,712 A | 9/1996 | Kihara et al. |
| 5,560,543 A | 10/1996 | Smith et al. |
| 5,562,846 A | 10/1996 | McKeen |
| 5,562,929 A | 10/1996 | Asano |
| 5,569,349 A | 10/1996 | Almquist et al. |
| 5,569,431 A | 10/1996 | Hull |
| 5,571,471 A | 11/1996 | Hull |
| 5,572,431 A | 11/1996 | Brown et al. |
| 5,573,721 A | 11/1996 | Gillette |
| 5,573,722 A | 11/1996 | Hull |
| 5,578,155 A | 11/1996 | Kawaguchi |
| 5,578,227 A | 11/1996 | Rabinovich |
| 5,582,876 A | 12/1996 | Langer et al. |
| 5,587,913 A | 12/1996 | Abrams et al. |
| 5,590,454 A | 1/1997 | Richardson |
| 5,593,531 A | 1/1997 | Penn |
| 5,594,652 A | 1/1997 | Penn et al. |
| 5,595,703 A | 1/1997 | Swaelens et al. |
| 5,596,503 A | 1/1997 | Flint |
| 5,596,504 A | 1/1997 | Tata et al. |
| 5,597,520 A | 1/1997 | Smalley et al. |
| 5,597,589 A | 1/1997 | Deckard |
| 5,598,200 A | 1/1997 | Gore |
| 5,598,340 A | 1/1997 | Medard et al. |
| 5,603,797 A | 2/1997 | Thomas et al. |
| 5,605,941 A | 2/1997 | Steinmann et al. |
| 5,607,540 A | 3/1997 | Onishi |
| 5,609,812 A | 3/1997 | Childers et al. |
| 5,609,813 A | 3/1997 | Allison et al. |
| 5,609,814 A | 3/1997 | Takano |
| 5,610,824 A | 3/1997 | Vinson et al. |
| 5,611,880 A | 3/1997 | Onishi |
| 5,611,883 A | 3/1997 | Tompkins et al. |
| 5,614,075 A | 3/1997 | Andre, Sr. |
| 5,616,293 A | 4/1997 | Ashtiani-Zarandi et al. |
| 5,616,294 A | 4/1997 | Deckard |
| 5,617,911 A | 4/1997 | Strerett et al. |
| 5,620,754 A | 4/1997 | Turchan et al. |
| 5,622,216 A | 4/1997 | Brown |
| 5,622,577 A | 4/1997 | O'Connor |
| 5,626,919 A | 5/1997 | Chapman et al. |
| 5,630,981 A | 5/1997 | Hull |
| 5,633,021 A | 5/1997 | Brown et al. |

| Patent | Date | Inventor |
|---|---|---|
| 5,634,593 A | 6/1997 | Jenkins |
| 5,635,243 A | 6/1997 | Turchan et al. |
| 5,637,169 A | 6/1997 | Hull et al. |
| 5,637,175 A | 6/1997 | Feygin et al. |
| 5,639,070 A | 6/1997 | Deckard |
| 5,639,402 A | 6/1997 | Barlow et al. |
| 5,639,413 A | 6/1997 | Crivello |
| 5,640,667 A | 6/1997 | Freitag et al. |
| 5,641,323 A | 6/1997 | Caldarise |
| 5,641,391 A | 6/1997 | Hunter et al. |
| 5,641,448 A | 6/1997 | Yeung et al. |
| 5,643,641 A | 7/1997 | Turchan et al. |
| 5,647,931 A | 7/1997 | Retallick et al. |
| 5,648,127 A | 7/1997 | Turchan et al. |
| 5,648,450 A | 7/1997 | Dickens, Jr. et al. |
| 5,649,277 A | 7/1997 | Greul et al. |
| 5,650,260 A | 7/1997 | Onishi |
| 5,651,934 A | 7/1997 | Almquist et al. |
| 5,653,925 A | 8/1997 | Batchelder |
| 5,656,230 A | 8/1997 | Khoshevis |
| 5,657,679 A | 8/1997 | Hronas et al. |
| 5,658,334 A | 8/1997 | Caldarise et al. |
| 5,658,412 A | 8/1997 | Retallick et al. |
| 5,658,506 A | 8/1997 | White et al. |
| 5,658,520 A | 8/1997 | Hards |
| 5,659,478 A | 8/1997 | Pennisi et al. |
| 5,660,621 A | 8/1997 | Bredt |
| 5,662,158 A | 9/1997 | Caldarise |
| 5,663,883 A | 9/1997 | Thomas et al. |
| 5,665,401 A | 9/1997 | Serbin et al. |
| 5,667,820 A | 9/1997 | Heller et al. |
| 5,669,433 A | 9/1997 | Sterett et al. |
| 5,672,312 A | 9/1997 | Almquist et al. |
| 5,672,380 A | 9/1997 | Uchida et al. |
| 5,676,904 A | 10/1997 | Almquist et al. |
| 5,677,107 A | 10/1997 | Neckers |
| 5,678,162 A | 10/1997 | Barlow et al. |
| 5,679,722 A | 10/1997 | Tamura |
| 5,684,713 A | 11/1997 | Asada et al. |
| 5,687,788 A | 11/1997 | Caldarise et al. |
| 5,688,464 A | 11/1997 | Jacobs et al. |
| 5,693,144 A | 12/1997 | Jacobs et al. |
| 5,694,324 A | 12/1997 | Masters et al. |
| 5,695,707 A | 12/1997 | Almquist et al. |
| 5,695,708 A | 12/1997 | Karp et al. |
| 5,697,043 A | 12/1997 | Baskaran et al. |
| 5,700,344 A | 12/1997 | Edgington et al. |
| 5,700,406 A | 12/1997 | Menhennett et al. |
| 5,705,116 A | 1/1998 | Sitzmann et al. |
| 5,705,117 A | 1/1998 | O'Connor et al. |
| 5,705,235 A | 1/1998 | Lehmann et al. |
| 5,722,479 A | 3/1998 | Oeftering |
| 5,725,586 A | 3/1998 | Sommerich |
| 5,728,345 A | 3/1998 | Hlavaty et al. |
| 5,728,510 A | 3/1998 | White |
| 5,730,817 A | 3/1998 | Feygin et al. |
| 5,730,925 A | 3/1998 | Mattes et al. |
| 5,731,388 A | 3/1998 | Suzuki et al. |
| 5,732,323 A | 3/1998 | Nyrhila |
| 5,733,497 A | 3/1998 | McAlea et al. |
| 5,736,201 A | 4/1998 | Flint |
| 5,738,817 A | 4/1998 | Danforth et al. |
| 5,740,051 A | 4/1998 | Sanders, Jr. et al. |
| 5,741,215 A | 4/1998 | D'Urso |
| 5,742,511 A | 4/1998 | Chasse et al. |
| 5,745,834 A | 4/1998 | Bampton et al. |
| 5,746,844 A | 5/1998 | Sterett et al. |
| 5,746,966 A | 5/1998 | McDonald |
| 5,749,041 A | 5/1998 | Lakshminarayan et al. |
| 5,749,408 A | 5/1998 | Gore |
| 5,752,962 A | 5/1998 | D'Urso |
| 5,753,171 A | 5/1998 | Serbin et al. |
| 5,753,274 A | 5/1998 | Wilkening et al. |
| 5,762,125 A | 6/1998 | Mastrorio |
| 5,762,856 A | 6/1998 | Hull |
| 5,764,521 A | 6/1998 | Batchelder et al. |
| 5,768,134 A | 6/1998 | Swaelens et al. |
| 5,770,947 A | 6/1998 | Brauchle |
| 5,775,402 A | 7/1998 | Sachs et al. |
| 5,776,409 A | 7/1998 | Almquist et al. |
| 5,779,833 A | 7/1998 | Cawley et al. |
| 5,779,967 A | 7/1998 | Hull |
| 5,780,070 A | 7/1998 | Yamazawa et al. |
| 5,780,580 A | 7/1998 | Shalaby et al. |
| 5,782,286 A | 7/1998 | Sommerich |
| 5,783,136 A | 7/1998 | Enke |
| 5,783,358 A | 7/1998 | Schulthess et al. |
| 5,783,615 A | 7/1998 | Steinmann et al. |
| 5,783,712 A | 7/1998 | Steinmann et al. |
| 5,784,279 A | 7/1998 | Barlage, III et al. |
| 5,785,918 A | 7/1998 | Hull |
| 5,807,437 A | 9/1998 | Sachs et al. |
| 5,817,206 A | 10/1998 | McAlea et al. |
| 5,824,260 A | 10/1998 | Sauerhoefer |
| 5,866,058 A | 2/1999 | Batchelder et al. |
| 5,878,664 A | 3/1999 | Hartka |
| 5,879,489 A | 3/1999 | Burns et al. |
| 5,900,207 A | 5/1999 | Danforth et al. |
| 5,902,441 A | 5/1999 | Bredt et al. |
| 5,939,008 A | 8/1999 | Comb et al. |
| 5,968,561 A | 10/1999 | Batchelder et al. |
| 5,984,444 A | 11/1999 | Hawley |
| 5,987,929 A | 11/1999 | Bostani |
| 5,989,679 A | 11/1999 | Sauerhoefer |
| 5,990,268 A | 11/1999 | Dickens, Jr. et al. |
| 5,997,291 A | 12/1999 | Fong et al. |
| 6,004,124 A | 12/1999 | Swanson et al. |
| 6,007,318 A | 12/1999 | Russell et al. |
| 6,007,764 A | 12/1999 | Benda et al. |
| 6,022,207 A | 2/2000 | Dahlin et al. |
| 6,025,110 A | 2/2000 | Nowak |
| 6,028,410 A | 2/2000 | Leavitt et al. |
| 6,036,777 A | 3/2000 | Sachs |
| 6,048,954 A | 4/2000 | Barlow et al. |
| 6,054,077 A | 4/2000 | Comb et al. |
| 6,056,843 A | 5/2000 | Morita et al. |
| 6,066,285 A | 5/2000 | Kumar |
| 6,067,480 A | 5/2000 | Stuffle et al. |
| 6,070,107 A | 5/2000 | Lombardi et al. |
| 6,085,122 A | 7/2000 | Manning |
| 6,085,957 A | 7/2000 | Zinniel et al. |
| 6,136,948 A | 10/2000 | Dickens, Jr. et al. |
| 6,146,567 A | 11/2000 | Sachs et al. |
| 6,153,034 A | 11/2000 | Lipsker |
| 6,159,411 A | 12/2000 | Kulkarni et al. |
| D436,111 S | 1/2001 | Hahn et al. |
| 6,174,156 B1 | 1/2001 | Chapman et al. |
| 6,206,672 B1 | 3/2001 | Grenda |
| 6,215,093 B1 | 4/2001 | Meiners et al. |
| 6,228,923 B1 | 5/2001 | Lombardi et al. |
| 6,238,613 B1 | 5/2001 | Batchelder et al. |
| 6,245,281 B1 | 6/2001 | Scholten et al. |
| 6,251,557 B1 | 6/2001 | Lapin et al. |
| 6,261,506 B1 | 7/2001 | Nguyen et al. |
| 6,309,581 B1 | 10/2001 | Gervasi |
| 6,324,438 B1 | 11/2001 | Corimer et al. |
| 6,340,297 B1 | 1/2002 | Chapman et al. |
| 6,340,528 B1 * | 1/2002 | Hsieh et al. .................. 428/412 |
| 6,367,791 B1 | 4/2002 | Calderon et al. |
| 6,375,874 B1 | 4/2002 | Russell et al. |
| 6,376,148 B1 | 4/2002 | Liu et al. |
| 6,391,245 B1 | 5/2002 | Smith |
| 6,413,360 B1 | 7/2002 | Morita et al. |
| 6,416,850 B1 | 7/2002 | Bredt et al. |
| 6,426,840 B1 | 7/2002 | Partanen et al. |
| 6,437,034 B2 | 8/2002 | Lombardi et al. |

| | | | | | |
|---|---|---|---|---|---|
| 6,450,393 B1 | 9/2002 | Doumanidis et al. | 2001/0031974 A1 | 10/2001 | Hadlock et al. |
| 6,495,794 B2 | 12/2002 | Shi | 2001/0050031 A1 | 12/2001 | Bredt et al. |
| 6,500,378 B1 | 12/2002 | Smith | 2002/0079601 A1 | 6/2002 | Russell et al. |
| 6,547,995 B1 | 4/2003 | Comb | 2002/0145213 A1 | 10/2002 | Liu et al. |
| 6,575,218 B1 | 6/2003 | Burns et al. | 2002/0153640 A1 | 10/2002 | John |
| 6,578,596 B1 | 6/2003 | Batchelder et al. | 2002/0155189 A1 | 10/2002 | John |
| 6,600,129 B2 | 7/2003 | Shen et al. | 2003/0004600 A1 | 1/2003 | Priedeman, Jr. |
| 6,602,377 B1 | 8/2003 | Bar-Erez et al. | 2003/0011103 A1 | 1/2003 | Swanson et al. |
| 6,610,429 B2 | 8/2003 | Bredt et al. | 2003/0028278 A1 | 2/2003 | Darrah et al. |
| 6,617,546 B2 | 9/2003 | Manetsberger et al. | 2003/0056870 A1 | 3/2003 | Comb et al. |
| 6,621,039 B2 | 9/2003 | Wang et al. | 2003/0064124 A1 | 4/2003 | Comb |
| 6,623,687 B1 | 9/2003 | Gervasi et al. | 2003/0082487 A1 | 5/2003 | Burgess |
| 6,629,011 B1 | 9/2003 | Calderon et al. | 2003/0127436 A1 | 7/2003 | Darrah et al. |
| 6,694,207 B2 | 2/2004 | Darrah et al. | 2003/0156178 A1 | 8/2003 | Lehmann |
| 6,780,368 B2 | 8/2004 | Liu et al. | 2004/0005374 A1 | 1/2004 | Narang et al. |
| 6,830,643 B1 * | 12/2004 | Hayes ................ 156/241 | | | |
| 2001/0025073 A1 | 9/2001 | Lombardi et al. | * cited by examiner | | |

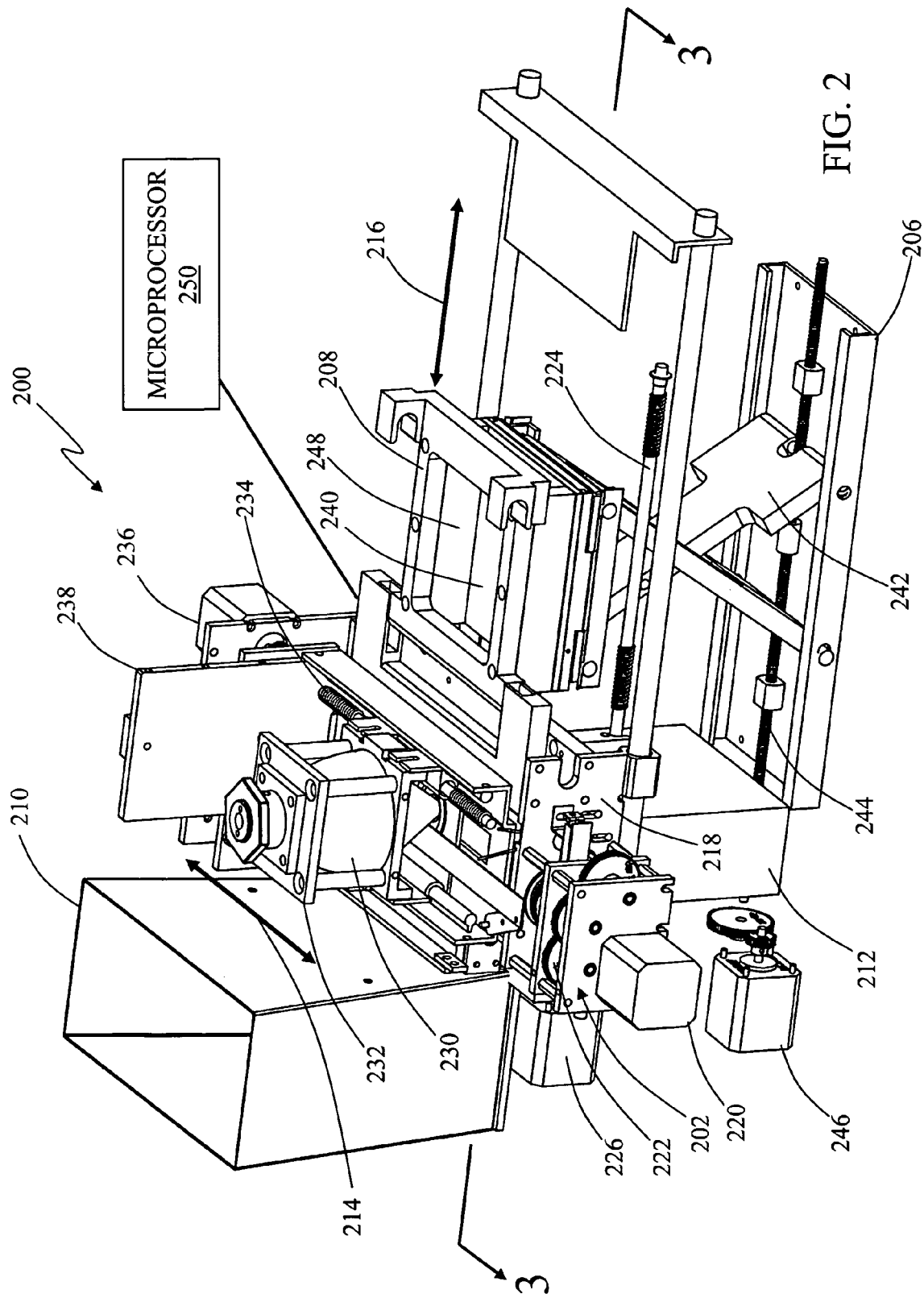

APPARATUS FOR THREE DIMENSIONAL PRINTING USING IMAGE LAYERS

CROSS-REFERENCE TO RELATED APPLICATION

This application claims the benefit of U.S. Provisional Patent Application Ser. No. 60/554,251 filed Mar. 18, 2004, entitled "Three Dimensional Printing," which is hereby incorporated by reference herein for all purposes.

TECHNICAL FIELD

The present invention relates to a system and method for generating three dimensional objects from a plurality of cross sectional information. In particular, the invention relates to a system and method for constructing three dimensional objects using inexpensive sources of heat and simple motion systems.

BACKGROUND

Three dimensional (3D) printers and rapid prototyping (RP) systems are currently used primarily to quickly produce objects and prototype parts from 3D computer-aided design (CAD) tools. Most RP systems use an additive, layer-by-layer approach to building parts by joining liquid, powder, or sheet materials to form physical objects. The data referenced in order to create the layers is generated from the CAD system using thin, horizontal cross-sections of the model. The prior art 3D printing systems that require heat to join the materials together generally employ high powered lasers and high precision motion systems containing a multitude of actuators to generate parts; resulting in a 3D printer which is generally too expensive for the home/hobbyist user or small mechanical design groups. There is therefore a need for 3D printers and RP systems that can generate parts on a layer-by-layer basis without a high power laser or other expensive energy source and with less expensive motion systems.

SUMMARY

The invention features a three-dimensional printer (3DP) adapted to construct three dimensional objects from cross sectional layers of the object that are formed on one surface, then subsequently adhered to the stack of previously formed and adhered layers. In the preferred embodiment, the 3DP includes a first surface adapted to receive a bulk layer of sinterable powder; a radiant energy source adapted to fuse a select portion of the layer of sinterable powder to form a sintered image; and a transfer mechanism adapted to concurrently transfer or print the sintered image from the first surface to the object being assembled while fusing the sintered image to the object being assembled. The layer of sinterable powder is preferably a polymer such as nylon that may be fused on a roller or drum, for example, with the energy provided by an incoherent heat source such as a halogen lamp. The transfer mechanism includes one or more actuators and associated controls adapted to simultaneously roll and translate the drum across the object being assembled so as to press and fuse the sintered image to the object. The transfer mechanism may further include a transfixing heater for heating the sintered image and the object immediately before the layer is applied to the object. The process of generating an image and transferring it to the object being assembled is typically repeated for each cross section until the assembled object is completed.

In some embodiments, the 3DP includes a powder applicator adapted to apply a predetermined quantity of sinterable powder to the drum for sintering. In the preferred embodiment, the applicator extracts the sinterable powder from a reservoir and permits the powder to briefly free fall, thereby separating the particles that may have compacted in the reservoir and normalizing the density of the particles applied in layer form to the drum. The powder applicator may further include a blade which, when placed a select distance from and angle relative to the drum, produces a layer of sinterable powder with uniform thickness and density on the drum as the drum is rotated.

In some embodiments, the drum of the 3DP includes a temperature regulator and drum heating element adapted to heat the temperature of the drum at or near the fusing point of the sinterable powder to reduce the energy required by the radiant energy source to print a sintered image from the layer of bulk powder on the drum. The 3DP may further include a first heating element, a second heating element, or both to reduce the energy required to fuse the sintered image to the object being assembled. The first heating element, which is incorporated into a platform assembly on which the object is assembled, for example, is adapted to hold the object at a first predetermined temperature above the ambient temperature. The second heating element is preferably a hot pad adapted to contact and maintain the temperature of the upper surface of the object being assembled at a second determined temperature until the next sintered image is applied to the upper surface. The second determined temperature is less than the melting temperature of the sinterable powder.

The 3DP in some embodiments further includes a layer thickness control processor adapted to regulate the thickness of a sintered image fused to the object being assembled. The layer thickness control processor may vary the thickness of the sintered image before or after transferring to the object being assembled by, for example, varying the quantity of sinterable powder dispensed by the applicator, regulating the position of an applicator blade with respect to the drum, regulating the time and pressure applied by the drum to transfer the sintered image to the object being assembled, compressing the sintered image after it is fused to the object being assembled, and removing excess material from the object being assembled by means of a material removal mechanism.

BRIEF DESCRIPTION OF THE DRAWINGS

The present invention is illustrated by way of example and not limitation in the figures of the accompanying drawings, and in which:

FIG. 2 is an isometric view of the three dimensional printer in accordance with the second preferred embodiment of the present invention;

DETAILED DESCRIPTION OF THE PREFERRED EMBODIMENT

Figure 1A:
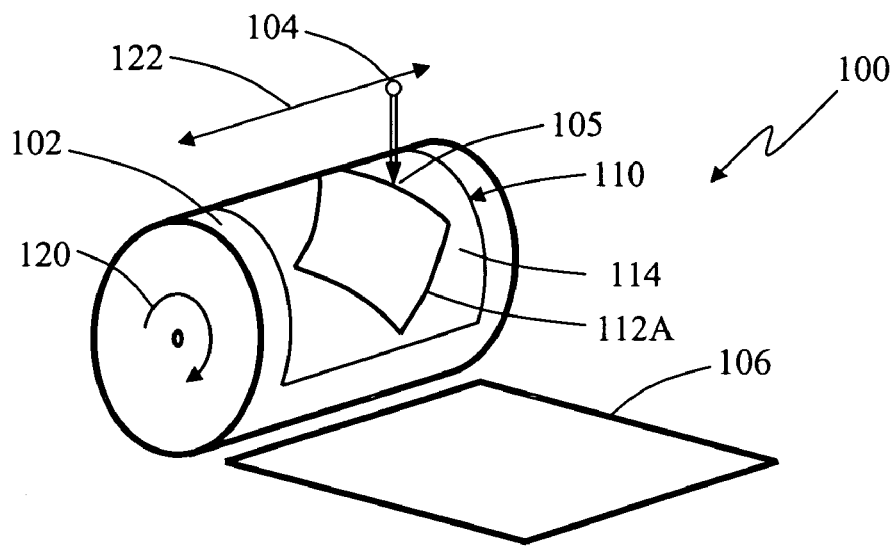
FIGS. 1A-1C are schematic diagrams demonstrating the operation of the three dimensional printer of the first preferred embodiment of the present invention.
Figure 1B:
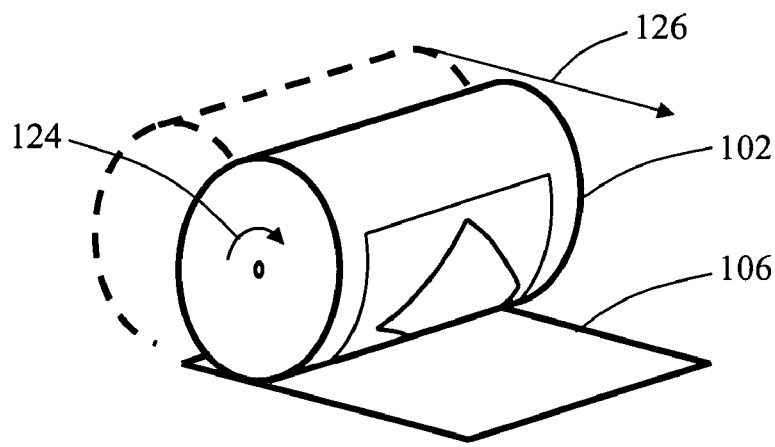
Figure 1C:
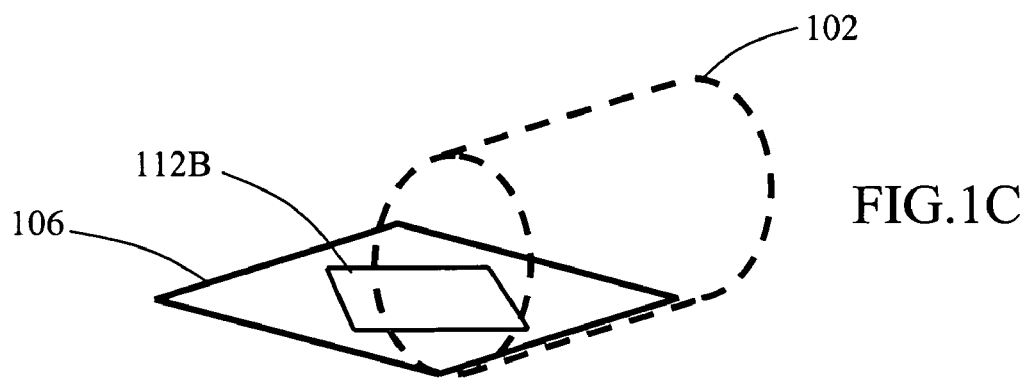

Illustrated in FIGS. 1A-1C is a schematic diagram demonstrating the operation of the three dimensional printer (3DP) of the first preferred embodiment. The 3DP 100 is adapted to construct a three dimensional (3D) part or object from a digital model of the object using a plurality of layers corresponding to cross sectional layers of the object. In the preferred embodiment, the cross sectional layers are formed from a powder whose particles can be sintered, i.e., to be formed into a coherent mass by heating. The layers of sintered powder referred to as sintered images are individually generated and sequentially assembled or printed onto a stack to build the object. Heat is used to fuse particles of the powder together to form individual layers as well as fuse individual layers together into the 3D object.

As illustrated in FIG. 1A, the 3DP 100 preferably includes a layer processing surface 102, a radiant energy source 104, and a work surface 106. The layer processing surface, e.g., the continuous surface of a process drum 102 or a planar surface, is adapted to rotate 120 about its longitudinal axis and pass over the work surface in a translational motion under the control of a microprocessor (not shown) and transfer or otherwise deposit the layers of sintered powder onto the work surface. The work surface is either a build surface on which the first sintered image is deposited or a preceding sintered image on the object being assembled. When produced on a layer processing surface separate from the object being assembled, the sintered image is permitted to express any distortion due to melting and density changes, for example, before the sintered image is affixed to the object, thereby reducing internal stresses that may arise in the object. As described below, production of the sintered image on the continuous surface of the drum 102 or other heated layer processing surface does not, in the preferred embodiment, typically require the energy required to concurrently fuse the image to the previous layer.

In the preferred embodiment, the process drum 102 includes a heating element (not shown) adapted to elevate the temperature of the outer surface of the drum to a predetermined value near the melting temperature of the sinterable powder employed. In the preferred embodiment, the sinterable powder is a crystalline nylon powder and the temperature to which the outer surface of the drum is raised is preferably low enough to prevent the powder from fully fusing but high enough above the ambient temperature of the sinterable powder to reduce the energy that must be injected to fuse the powder into a sintered image and subsequently, to weld or otherwise adhere the sintered image to the object under construction. A uniform layer of sinterable powder 110 is applied in bulk to drum 102. The sinterable powder, which is made tacky by the heat of the drum 102, adheres to the drum without the particles of the layer 110 fusing together. Electrostatic attraction may also be used in combination with a heated drum or alone with an unheated drum to releasably or removably adhere sinterable powder to the drum 102.

Portions of the layer of sinterable powder 110 representing a cross sectional layer of the object being formed are sintered by a radiant energy source 104. The energy source 104, preferably a focused heat source having a focal point 105 on the drum 102, i.e., the continuous surface of the drum, heats the powder to a temperature sufficient to fuse the powder. The powder may be fused by partially liquefying the powder or by fully liquefying the powder which then cools back to a solid at the roller temperature once the energy source 104 is removed. A sintered image 112A is formed by moving the heat source 104 relative to the continuous surface of the drum 102 to trace lines or regions of sintered powder across the layer of sinterable powder 110. In the preferred embodiment, the cross sectional layer of the object may take on any complex configuration by rotating 120 the drum 102 and translating 122 the heat source 104 under the control of the microprocessor. Unsintered powder continues to adhere to the drum 102 in this illustrative example.

As illustrated in FIG. 1B, the sintered image—illustrated in the form of a diamond 112A—is then transferred to the work surface 106 by simultaneously rotating 124 the drum 102 while translating 126 the drum across the work surface. As the drum 102 advances across the work surface 106 from its initial position illustrated by dashed lines, the sintered image 112A detaches from the drum and transfers to the work surface. The sintered image and the portion of the object receiving the sintered image, in some embodiments, are exposed to a heat source for transfixing the sintered image to the object being assembled. A transfixing heater, such as a fuser lamp (discussed in more detail below), increases the tackiness of the sintered image and the work surface for purposes of enhancing the layer-to-layer fusion or welding and ensuring that the sintered image has a greater adhesion to the work surface than the drum 102. The distance between the translated drum surface 102 and the work surface 106 is approximately equal to or less than the thickness of the sintered image 112A. As stated above, the term work surface 106 as used herein refers to a surface on which the current sintered image is deposited, which may be the platform of the 3DP 100 or a previous sintered image layer laid down during the assembly of the 3D object.

In the preferred embodiment, the sintered image is concurrently transferred to and fused with the object being assembled. In some embodiments, however, the sintered image may first be deposited onto the object and subsequently fused by, for example, a fuser lamp that follows the drum, a bulk heating process, a hot pad (discussed in more detail below), or a combination thereof.

As illustrated in FIG. 1C, the entire sintered image is deposited onto the work surface 106 once the drum 102 has traversed the length of the work surface and the drum reached its final position illustrated by dashed lines. Unsintered powder, left over after the sintered image is formed, may be removed from the drum 102 before or after transferring the sintered image to the object, removed from the work surface 106 after transferring, or retained at the work surface after transfer to provide support for the subsequent sintered image, particularly overhanging sections of the next sintered layer deposited onto the object 112B. This process of producing and depositing a sintered image is repeated for each cross section of the object being constructed from the model.

Figure 3:
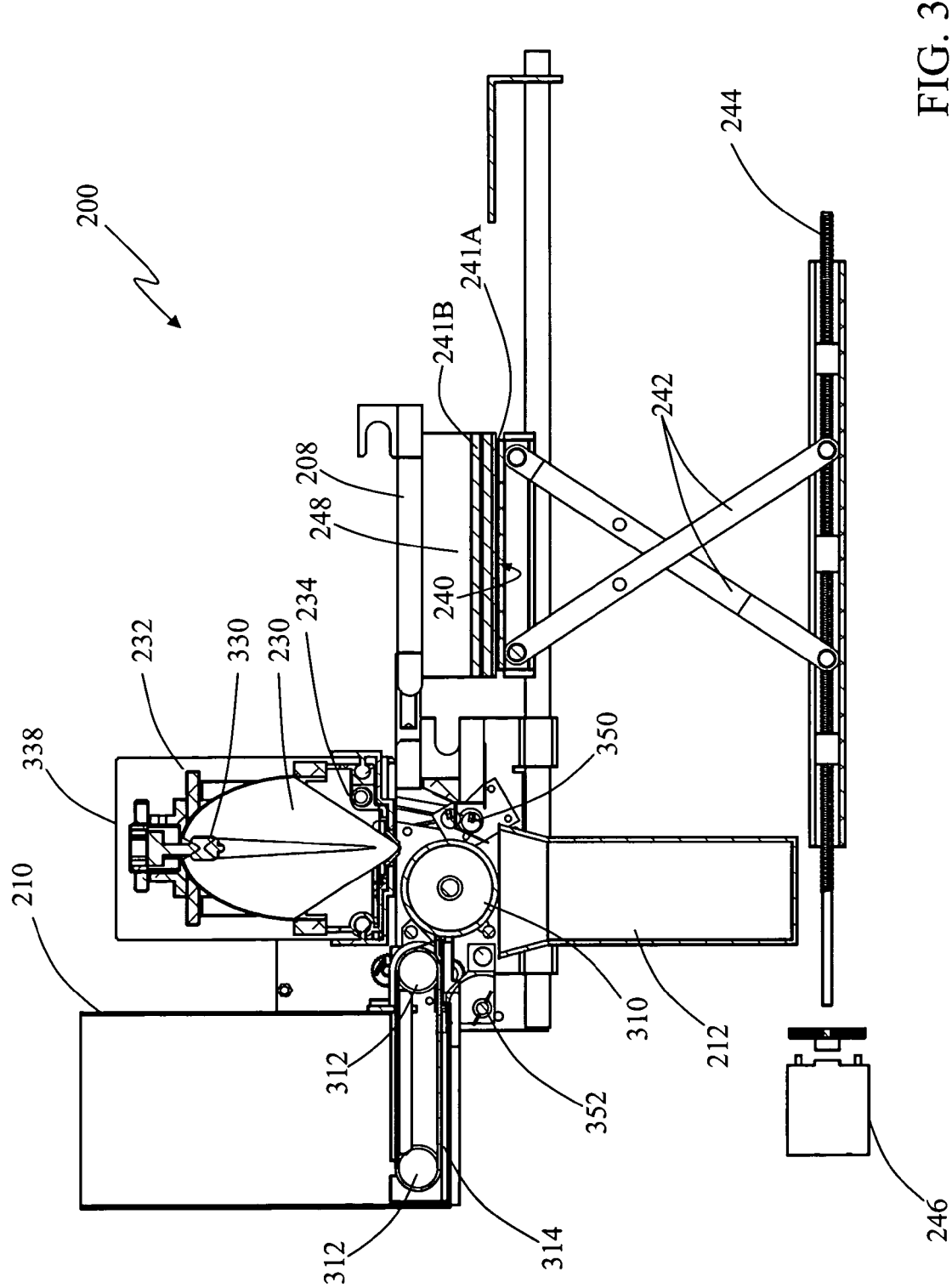
FIG. 3 is a cross sectional view of the three dimensional printer in accordance with the second preferred embodiment of the present invention.

Illustrated in FIGS. 2 and 3 is a 3DP 200 in accordance with the second preferred embodiment of the invention. Consistent with the first embodiment, the second embodiment includes a drum assembly 202, a sintering assembly, a platform assembly, and a microprocessor 250. This embodiment of the 3DP 200 further includes a sinterable powder applicator 210, a sinterable powder reservoir 212, an object heating element 208, and means for cleaning the roller and work surface in preparation for the next sintered image. The drum assembly 202 includes a drum frame 218 and a process drum 310 adapted to rotate in response to a first actuator, preferably a stepper motor 220, operably coupled to the drum via one or more reduction gears 222.

Figure 4:
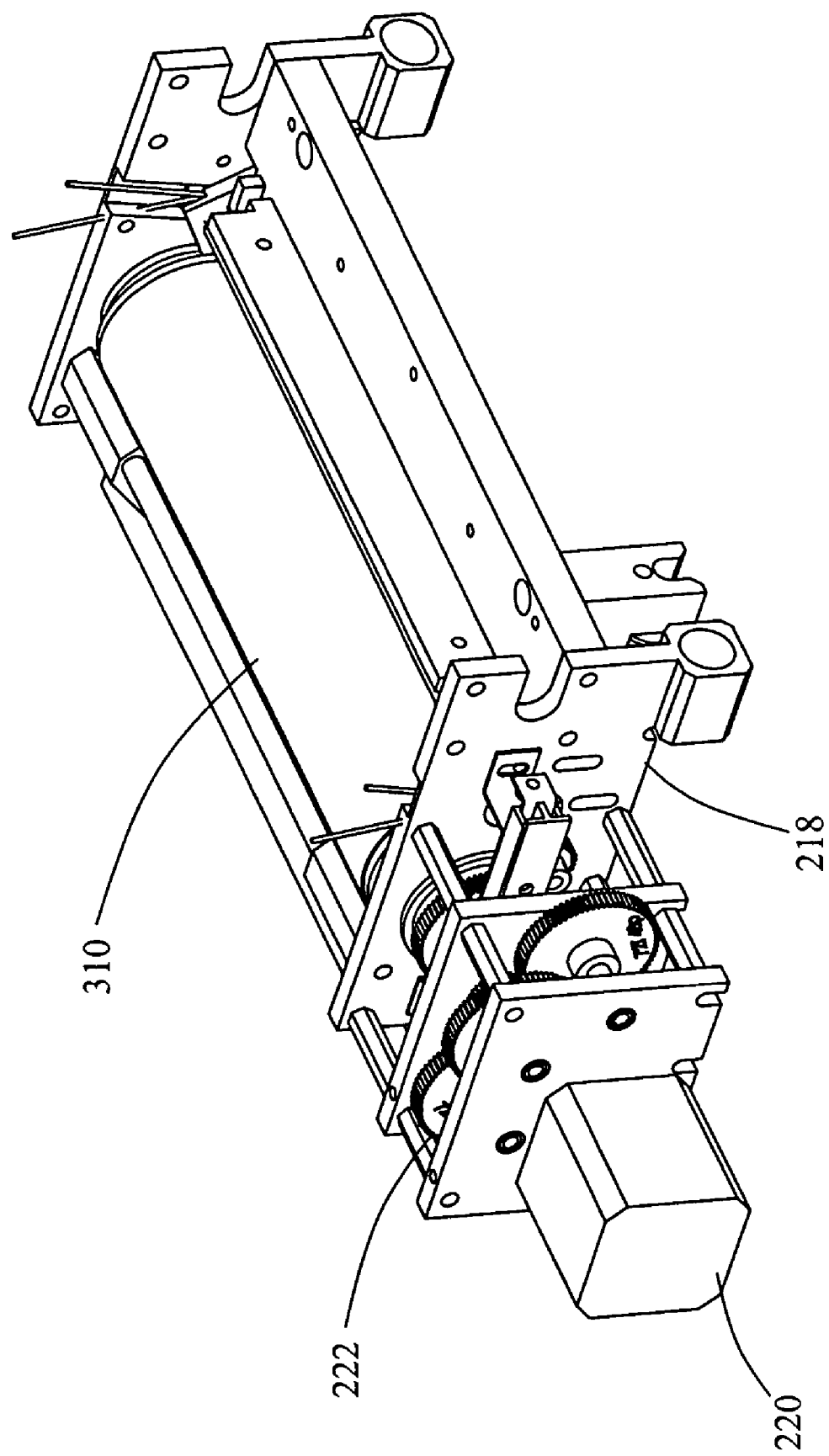
FIG. 4 is an isometric view of the drum assembly in accordance with the second preferred embodiment of the present invention.

The drum assembly in this embodiment, also illustrated in FIG. 4, further includes a second actuator, preferably a stepper motor 226, to drive the drum 310 laterally across the length of the work surface (direction perpendicular to the longitudinal axis of the drum 310) preferably via a lead screw 224. The drum 310 is preferably a smooth anodized aluminum drum onto which the sinterable powder is applied. An anodized aluminum drum provides thermal stability and durability although other thermally conductive and non-conductive materials may also be used. In the preferred embodiment, the circumference of the drum 310 is equal to or greater than the length (direction perpendicular to drum axis) of object being constructed. In other embodiments, however, the drum may have a circumference smaller than the length of the working surface if the steps of applying the powder, imaging the powder, and depositing the sintered image are performed substantially concurrently as part of a continuous process. The outer surface of the drum 310 may be coated with a nonstick surface such as TEFLON, for example, to inhibit the sintered image or the unsintered powder from unduly adhering to the drum 310, to minimize heat loss into the drum during imaging, or to enable an electric field to be employed to aid powder adhesion.

The drum assembly may also include a temperature regulator (not shown) and drum heating element—preferably a tubular halogen lamp or cartridge heater 802, for example, (see FIG. 8A) mounted internal to the drum 310—adapted to heat the drum 310 to a temperature substantially near, but lower than, the fusing point of the sinterable powder. In the preferred embodiment, the sinterable powder is a crystalline nylon powder and the temperature to which the outer surface of the drum is raised is between approximately 2 degrees Celsius and 15 degrees Celsius below the powder's melting point. A higher roller temperature is generally employed to facilitate relatively rapid sintering of the powder with minimal input energy from the imaging lamp system, although the 3DP system may be more susceptible to roller temperature variations and powder temperature variations that can result in unintentional sintering of powder on the roller. In contrast, the drum may be held at a lower temperature to improve sintered image quality, although the sintering process and overall object production may take longer. In some embodiments, the drum assembly further includes a transfixing heater 804 (see FIG. 8A) for heating the outer side of the sintered image immediately before the sintered image is deposited on the preceding sintered image of the object. Similarly, in some embodiments the heating element may also heat the top surface of the previously deposited sintered image of the object being formed. The transfixing heater 804—such as a halogen lamp, tungsten wire heater, or nichrome wire heater, for example—may be mounted on the assembly housing the drum 310 in proximity to the drum and the platform assembly or work surface. In order to control the amount of heat applied to the surfaces to be adhered, the transfixing heater is preferably further includes an adjustable mask to limit the area of exposure for each surface.

Figure 5:
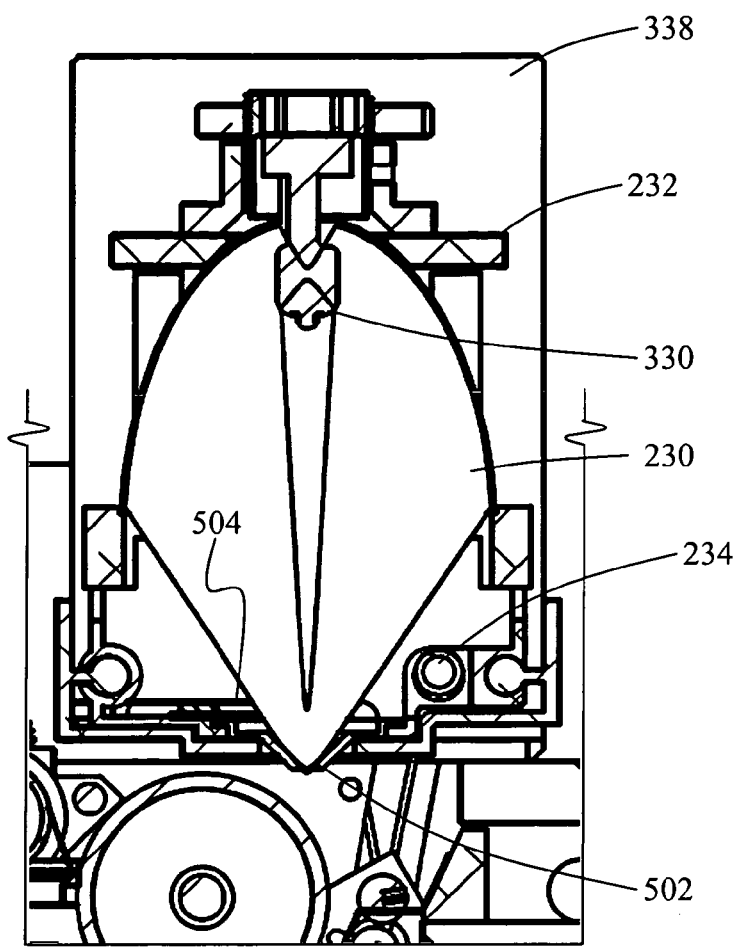
FIG. 5 is a cross sectional view of the sintering assembly in accordance with the second preferred embodiment of the present invention.

The sintering assembly in the second preferred embodiment, also illustrated in FIG. 5, includes a housing 232 and frame 338 supporting an incoherent energy source 330 whose energy is focused on or in proximity to the drum 310 via a reflector 230 or lens to provide a small area of concentrated heat. The heat source 330 is preferably a halogen lamp with an axial filament whose long axis coincides with the focal axis of symmetry. The halogen lamp is available from Sylvania of Danvers, Mass., although any of a number of other heat sources may be used including tungsten bulbs and arc lamps. As illustrated in the cross sectional view of FIG. 3, the reflector 230 possesses a substantially elliptical cross section for purposes of optimizing the concentration of energy from the heat source 330. A suitable reflector 230 is available from Melles Griot of Carlsbad, Calif., part # 02 REM 001. In some embodiments, the sintering assembly further includes a mask 502 with an adjustable aperture or plurality of selectable apertures for further controlling the spot size of the focal point which may be varied between approximately 10 and 200 mils in the second preferred embodiment. The design of the mask 502 may also include a parabolic surface of revolution, for example, a Winston cone, that further concentrates the energy from the heat source 330 to produce a smaller spot, thus minimizing the power consumption and obviating the need—in this embodiment—for a laser energy source. In some embodiments, the sintering assembly further includes a shutter 504 interposed between the heat source 330 and drum 310 for effectively interrupting the energy beam. In embodiments where the aperture size can be selected and dynamically changed, the rate at which the heat source moves across the powder can be varied during construction of a sintered image or object to compensate for the changes in power incident at the focus. The heat source 330 is preferably adapted to move co-parallel relative to the axis of the drum 310 by means of an actuator, e.g., a stepper motor 236, and a lead screw 234.

In some alternative embodiments, the sintering assembly employs a laser or laser diode matched to an absorption band of the sinterable powder layer as a heat source. The sintering assembly may further include a steerable or rotating mirror in a fixed position that is adapted to aim the laser heat on the drum 310, thereby obviating the need to sweep the sintering assembly over the drum 310 and reducing the number of high precision actuators.

The platform assembly in the second preferred embodiment includes a horizontal build surface on which the first sintered layer is deposited and the complete object assembled. In the preferred embodiment, the build surface 240 incorporates a heating pad 241A (discussed below) into the build surface on which the object is constructed from printed sintered images. The height of the build surface 240 is adjusted relative to the drum 310 by means of a scissor lift 206 including two cross arms 242, a lead screw 244 with left handed and right handed threads on either end, and an actuator, preferably a stepper motor 246. Rotation of the lead screw 244 causes the two cross arms 242 to rotate toward or away from each other depending on the direction of rotation, thereby enabling the build surface 240 to ascend or descend, respectively. In some embodiments, the build surface 240 is adapted to rotate in the horizontal plane with respect to the scissor lift 206, thereby allowing the build surface 240 to be rotated to a random angle preceding the deposition of each sintered image to prevent the accumulation of repetitive errors or artifacts which, if uncorrected, may result in vertical non-uniformities or nonlinearities in the assembled object. One skilled in the art will appreciate that the orientation of the sintered image produced on the drum 310 should reflect the same angular rotation as the build surface 240.

For each sintered image deposited, the height of the build surface 240 relative to the drum 310 is adjusted such that the top of the object being constructed is lower than the drum 310 by a distance substantially equal to the thickness of a sintered image applied to the object. In this embodiment, the platform is lowered after each image is applied to the object, but, in another embodiment the height of the drum could be adjusted upward to compensate for the thickness of the object as the object is assembled. In some embodiments, the build surface 240 is the bottom of a object build vat having side walls (not shown) that contain both the object and the unsintered powder remaining after printing of sintered images, thereby providing a foundational support for portions of subsequent sintered images that have no object immediately below them.

The actuation of the stepper motors employed in the drum assembly, the sinter assembly, and the platform assembly are preferably cooperatively controlled by the microprocessor 250 adapted to concurrently rotate the drum 310 and translate the sinter assembly to deposit each of the plurality of cross-sections from which the object is constructed.

Figure 6:
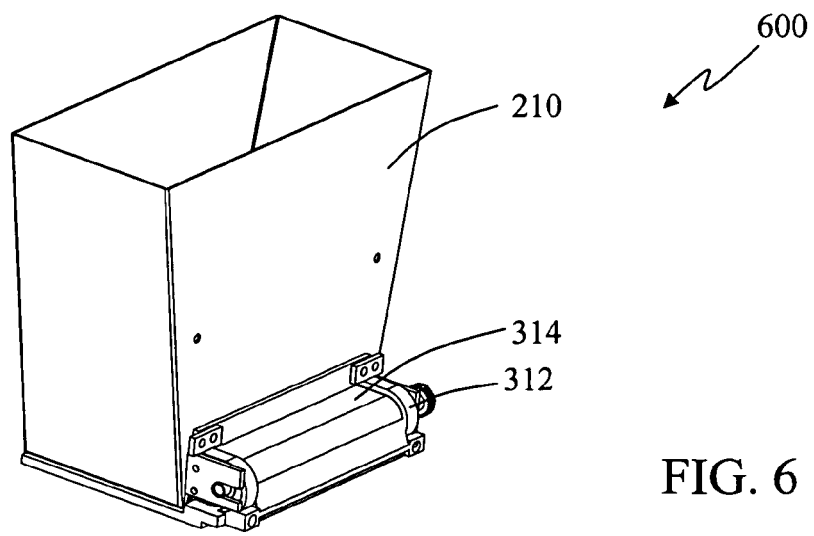
FIG. 6 is an isometric view of the powder applicator in accordance with the second preferred embodiment of the present invention.
Figure 7A:
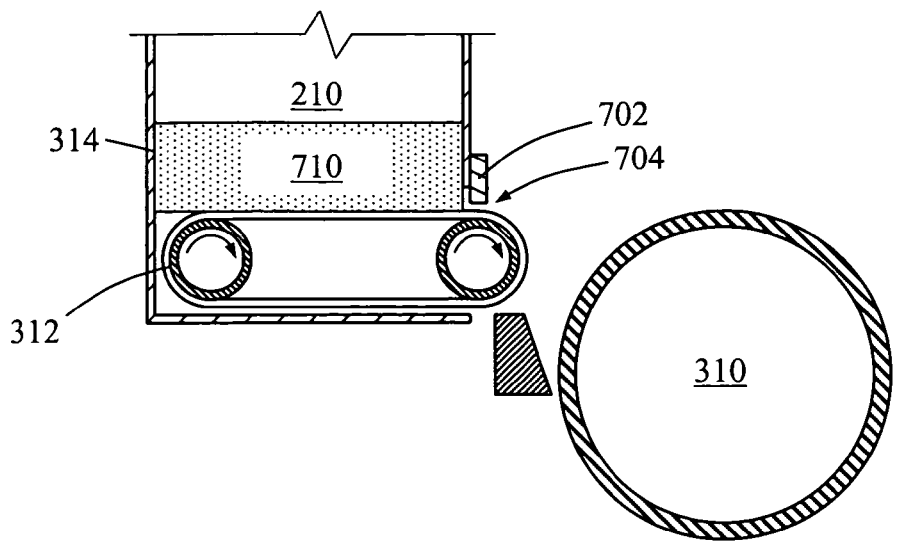
FIGS. 7A-7C are schematic diagrams demonstrating the operation of the powder applicator in accordance with the second preferred embodiment of the present invention.
Figure 7B:
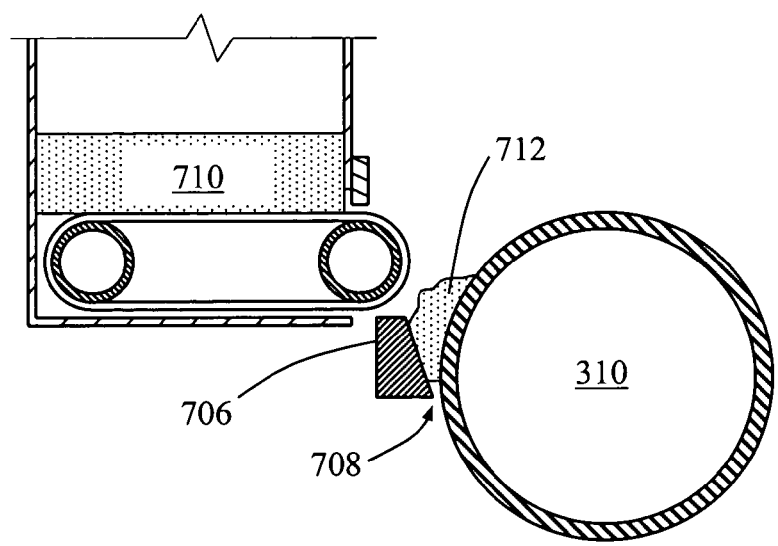
Figure 7C:
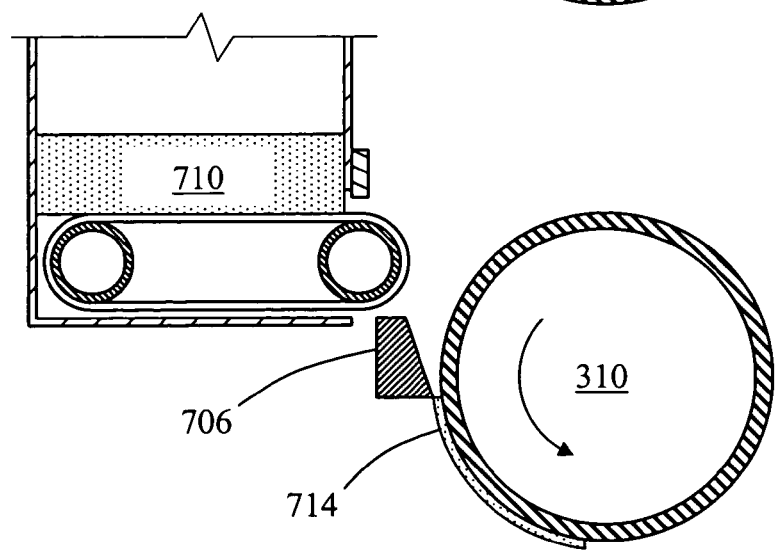

In some embodiments, the 3DP further includes a sinterable powder applicator to apply powder to the drum 310 and one or more sinterable powder reservoirs 212 used to collect unsintered powder recovered from the drum 310 and unsintered powder recovered from the work surface. Referring to FIGS. 2-3 and FIG. 6, the powder applicator 600 of this embodiment includes a sinterable powder bin 210 from which sinterable powder is dispensed and applied to the drum 310 using, for example, a powder conveyor belt 314 and pulleys 312. As demonstrated by the powder applicator schematics in FIGS. 7A-7C showing the formation of a sinterable powder layer, sinterable powder 710 is drawn from bin 210 as the pulleys 312 are turned and the belt 314 advanced. An agitator (not shown) in or attached to the bin 210 may be employed to enhance the transfer of powder. The volume of sinterable powder dispensed by the belt 314 is preferably precisely controlled by the adjustable gate 702 and the gap thereunder. As the powder falls off of the conveyor belt to the cavity above the applicator blade, the powder density is normalized to ensure uniform and repeatable density as the powder is applied to the drum regardless of how the powder was compacted in the powder bin. The dispensed powder 712 accumulates against the drum 310 and a layer control blade 706 used to regulate the thickness and uniformity of the powder applied to the drum 310. The cavity 708 created between the blade 706 and drum 310 is preferably wedge-shaped with a relatively wide upper gap to properly draw powder and a narrower lower gap to spread the powder uniformly across the width of the drum 310— and preferably compact the powder to the proper density— as the drum is turned. The thickness of the sintered layer produced is preferably between 5 and 20 mils thick depending on the vertical resolution of the object required. As discussed above, the resulting layer 714 of sinterable powder adheres to the drum 310 due to the inherent tackiness induced by the heating lamp 802 therein.

In the preferred embodiment, the sinterable powder is a crystalline plastic powder such as Nylon #12 having an average particle size of 60 microns although this is subject to variation depending on the 3D printing requirements and the manufacturing method, for example. In some embodiments, the sinterable powder includes a distribution of two or more particle sizes, namely a first set of relatively large particles and a second set of relatively small particles where the diameter of the smaller particles is selected to substantially fill the inter-particle voids present between the larger particles, thereby increasing the density of the sintered powder and reducing the shrinkage of the object. The distribution of particle sizes, referred to herein as a modal distribution, may include a plurality of nominal particle size, each being successively smaller, to provide maximal powder density.

In the alternative to Nylon #12, various other sinterable materials may also be employed including Nylon #11, Acrylate Butadiene Styrene (ABS), Polystyrene and other powders with a similar particle size. The sinterable powder may further include a radiation absorbent agent or dye that increases the effective absorptivity, which is substantially symmetric to the emissivity, of the powder in the wavelength band of radiation emitted by the heat source. For example when the heat source is visible light black or grey coloring agents may be employed to increase the powder's energy absorption, thereby increasing the rate at which the powder may be sintered and the object assembled. The radiation absorbent agent may also allow lower power incoherent energy sources including lamps as well as coherent energy sources including laser and laser diodes to be used as a sintering radiation source. In other embodiments using a laser or laser diode, the dye may be absorptive primarily in the narrow emission band of the laser.

In some embodiments, the 3DP 200 is adapted to produce one or more sintered images from a sinterable powder including metal, for example. One exemplary product is distributed under the trade name METAL MATRIX PLASTIC by Hi-Temp Structures of Gardena, Calif.

In the second preferred embodiment illustrated in FIG. 3, the 3DP 200 further includes one or more object heating elements, preferably including a first heating pad 241A and a second heating pad 241B rotatably affixed to the platform assembly. The first heating pad 241A contacts the bottom side of the object under construction. The second heating pad 241B (discussed in more detail below) is generally placed in proximity to or in contact with the upper side of the object (not shown). Together or individually, the first heating pad 241A and a second heating pad 241B elevate the temperature of the object for purposes of enhancing the bond between the next sintered image and the object and reducing temperature gradients in the part, therefore inhibiting internal stresses that may induce dimensional inaccuracies in the object.

Figure 8A:
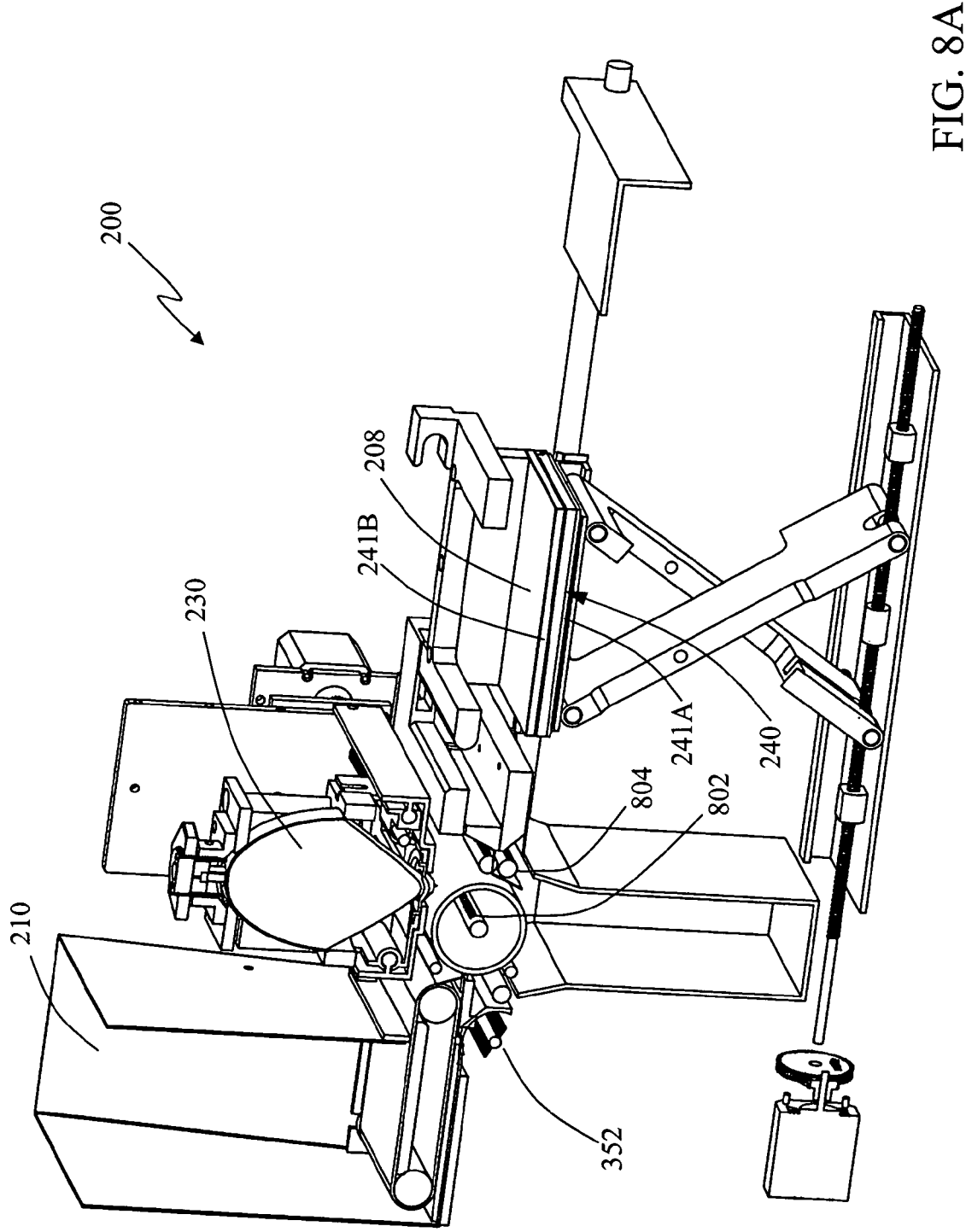
FIGS. 8A-8D are cross sectional isometric views demonstrating the three dimensional printer forming a sintered image and applying it to the object under construction in accordance with the second preferred embodiment of the present invention.

The mechanical operations by which the 3DP 200 forms a sintered image and applies it to the object under construction is illustrated in FIGS. 8A-8D which are cross-sectional views drawn in perspective. Referring to FIG. 8A, sinterable powder sufficient for a single sintered layer is dispensed in bulk to the drum 310 which resides in its home position in proximity to the bin 210. The drum 310 is rotated and the newly applied sinterable powder is formed into a layer as the drum is turned. The cartridge heater 802 and transfixing heater 804 are clearly visible in the several views of FIGS. 8A-8D.

Figure 8B:
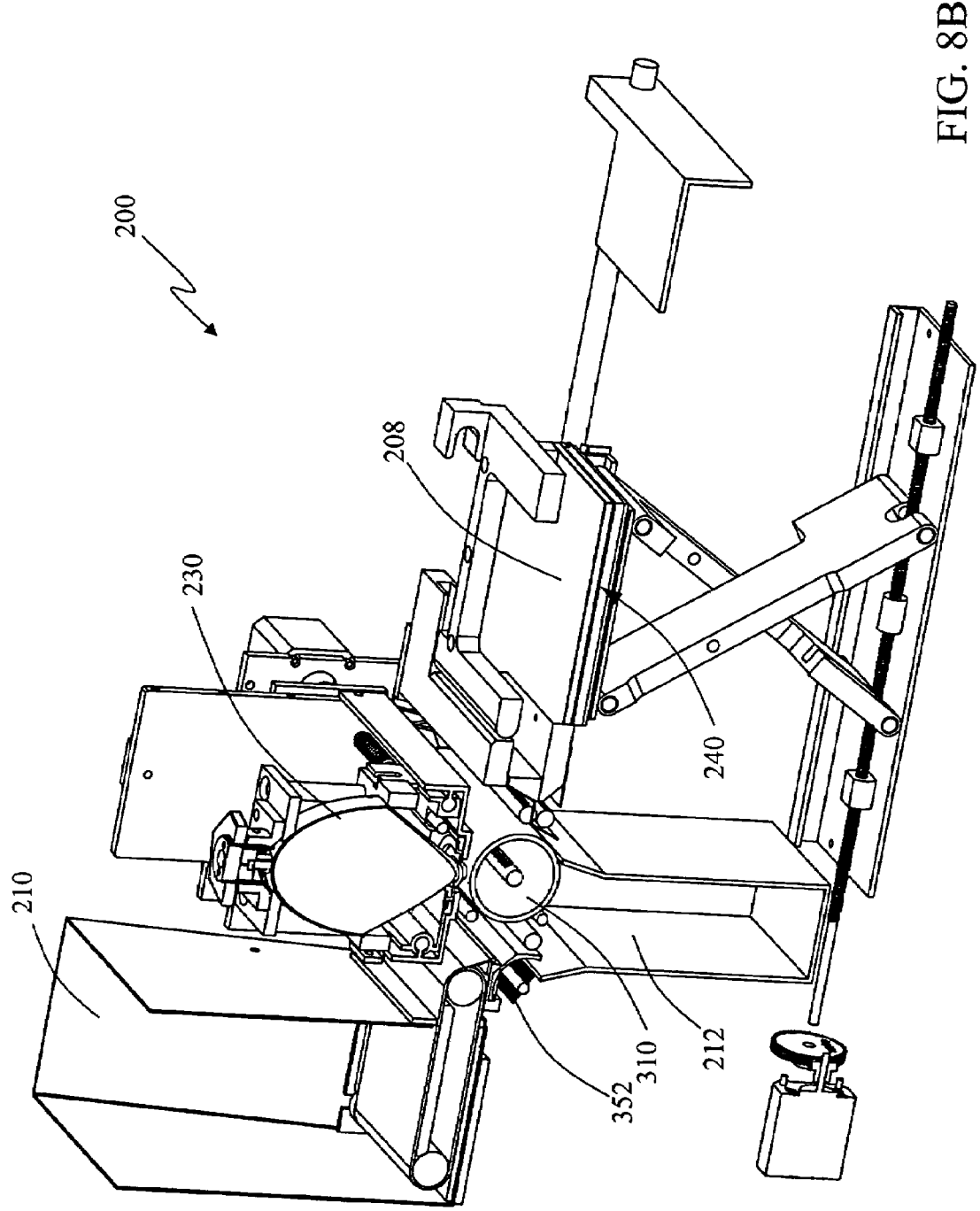

The Referring to FIG. 8B, the drum 310 in this embodiment advances to a position coinciding with the focal point of the lamp assembly and portions of the powder layer are sintered to form one or more solid portions reflective of the associated model cross section. The focal spot may be swept over the drum surface in accordance with a raster pattern or in accordance with model vector data, for example, depending on the digital format of the model cross sectional data. In the preferred embodiment, a raster sequence and patterns are used to minimize internal stresses within an imaged layer.

Figure 8C:
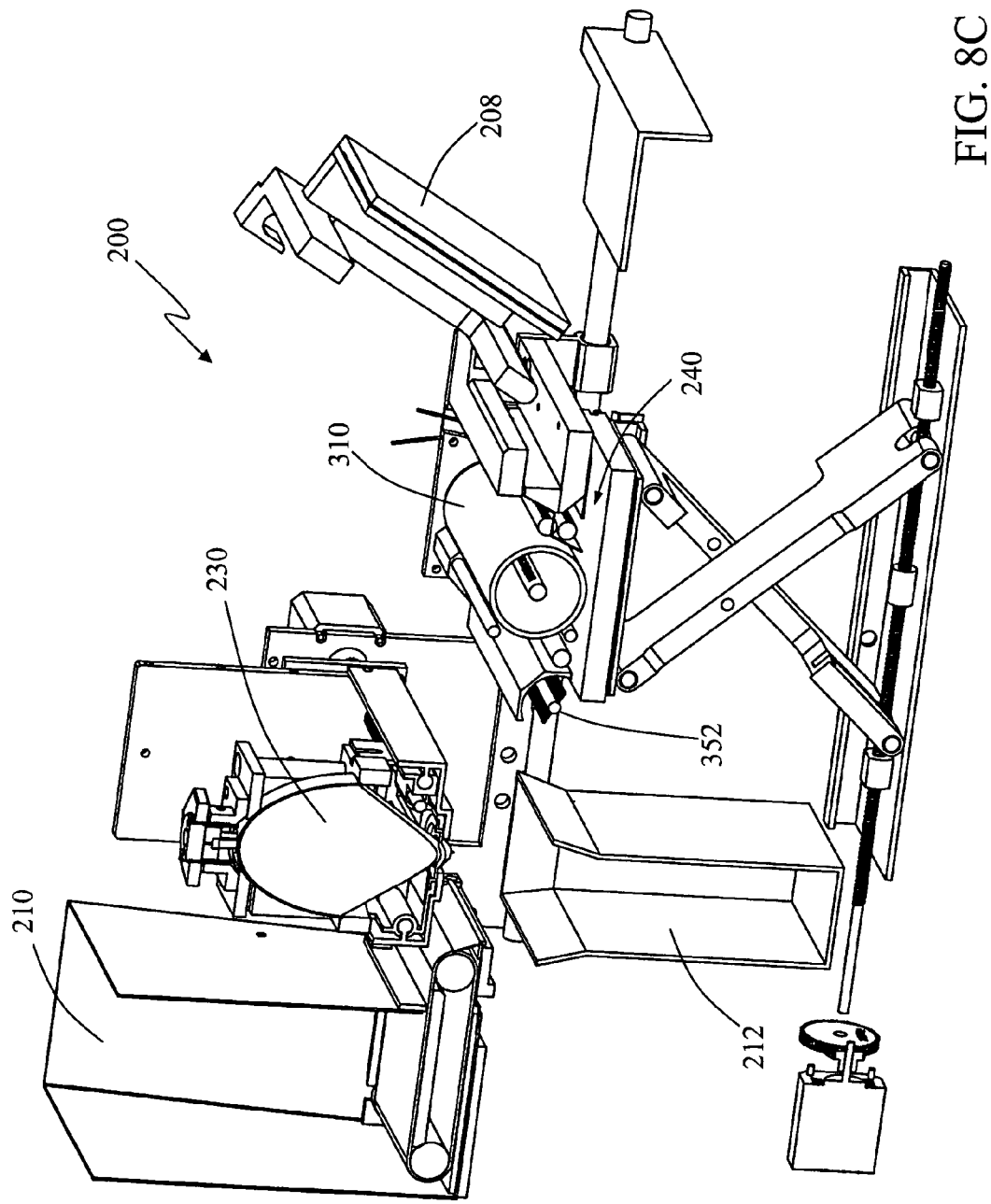

Referring to FIG. 8C, the drum 310 with the sintered image is rotated while being driven to the right in this illustration moving it over the top of the platform. The gap between the drum 310 and the work surface is less than or equal to the thickness of the sintered image—preferably substantially equal to the thickness of the sintered image— and the drum rotated such that the sintered image being deposited on the work surface is stationary with respect to the work surface to prevent slippage or displacement of the object under construction. When the gap between the drum 310 and the work surface is less than the thickness of the sintered image, the pressure exerted on the sintered image may improve the fusion between the image and object as well as increase the density of the object.

In some embodiments, the 3DP 200 further includes a layer thickness control processor, which may be embodied in the microprocessor 250 or a separate processor, that dynamically controls the thickness of the object being constructed as the sintered image is applied to the object. The layer thickness control processor preferably detects the thickness of the entire object or one or more sintered images as the object is being built and, using feedback, changes the thickness of the sinterable powder applied to the drum 310 or alters the pressure used to weld a sintered image to the object. The pressure may be controlled, for example, by altering the interference gap between the drum 310 and work surface so that translation of the drum across the work surface induces pressure that enhances the weld between the sintered image and object. In other embodiments, the layer thickness control processor controls the time and temperature of the pressure applied between the drum and object to achieve the desired layer density and to ensure bonding. In particular, the layer thickness control processor is adapted to vary the speed and temperature with which the drum 310 is translated across the work surface between image layers to normalize the image thickness and provide optimal bond quality. The transfixing heater 804 is preferably enabled as the drum 310 traverses the length of the work surface.

Figure 8D:
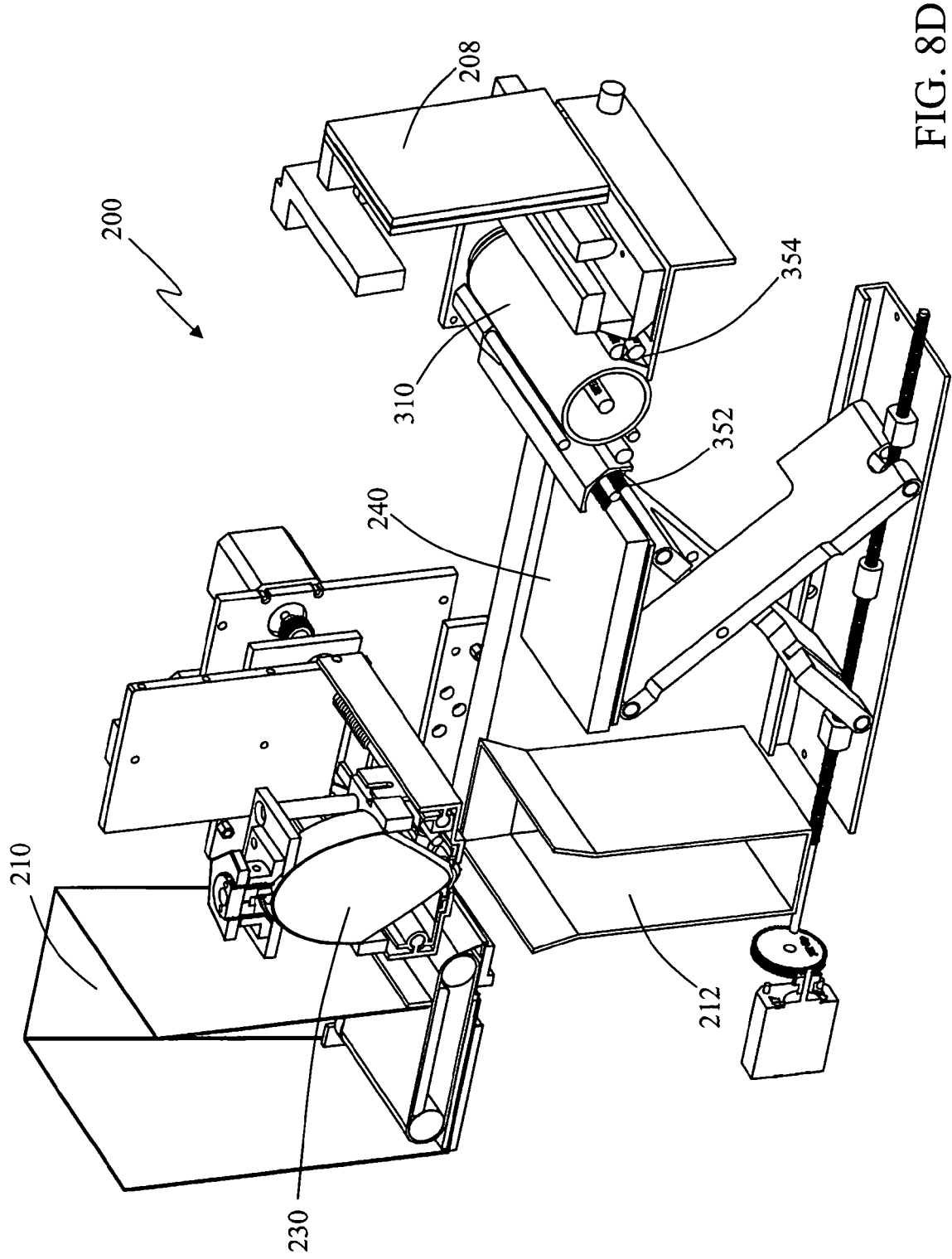

At the distended drum position to the right of the platform illustrated in FIG. 8D, a scraper 354 or brush, for example, is placed in contact with the drum 310 while the drum is turned against the scraper to remove any remaining powder or debris. The angle between the scraper 354 and the drum 310 is preferably between 0 and 45 degrees and the rate at which the drum is turned is preferably between 10 and 100 inches per minute. In some embodiments, the 3DP 200 further includes a powder reservoir (not shown) to collect the powder or debris removed by the scraper 354. In the alternative, an electric field and corona wire with a high potential difference with respect to the drum 310 may also be used to remove excess powder from the drum.

The drum 310 is returned to its home position, the work surface cleaned to remove excess unsintered powder, the build platform lowered by the scissor lift 206 to compensate for the thickness of the newly applied sintered image, the heating pad reapplied to the object under construction, and the process described above repeated until the object is completed. In the second preferred embodiment, the means for cleaning or otherwise preparing the work surface includes a retractable rotary brush 352 incorporated into the drum assembly so that it may track the drum 310 as it traverses the work surface. In the preferred embodiment, the brush 352 is distended below the drum 310 before returning to its home position to left in the example illustrations of FIGS. 8A-8D, and a cylindrical brush head makes contact with the object and rotates clockwise to clear away loose powder from the work surface or to level the unsintered powder to the level of the newly deposited sintered image. The retractable rotary brush 352 assumes a retracted configuration as the drum passes left to right, as illustrated, depositing a sintered image so as to avoid disturbing the newly deposited image before it has cooled sufficiently.

In some other embodiments, the material removal mechanism for cleaning the work surface includes a vacuum, a conductor for drawing powder off the work surface using electrostatic attraction, a non-retractable brush, a blower for providing high velocity air, or a combination thereof. A non-retractable brush connected to the drum 310 may have a brush head, for example, adapted to maintain an interference with the work surface in order to sweep the work surface immediately after the image is transferred. In still other embodiments, the 3D printer further includes object cooling means for directing air, for example over the object to accelerate the rate at which a newly deposited sintered image is cooled, thereby allowing the object to be cleaned by a brush 352 immediately before and after the image is deposited, i.e., as the drum 310 traverses the work surface to the left and to the right.

As discussed above, the 3DP 200 in some embodiments includes a second heating pad 241B and corresponding support frame 208 rotatably attached to the drum assembly. The second heating pad 241B, also referred to as a "hot pad," is adapted to elevate and or maintain the temperature of the upper side of the object until the next sintered image is applied. As shown in FIGS. 8D and 8A, the pad 241B and frame 208 rotate up to provide clearance for the drum 310 as an image is deposited onto the object and then rotate back down to a point where it is in contact with the object as the drum 310 returns to its home position and the work surface is cleaned of unsintered powder. When in contact with the object, the second heating pad 241B raises the upper surface of the object to within several degrees of its melting point. This serves to reduce the amount of energy that must be added to weld the next sintered image to the object, to enhance the bond between the next sintered image and the object, and to preserve the dimensional uniformity of the upper surface of the object which is prone to dimensional distortion from internal stresses caused by temperature gradients.

In some embodiments, the second heating pad 241B also cooperates with a pressure sensing mechanism (not shown) and the layer thickness control processor (discussed above) to apply a determined heat and pressure to the top of the previously formed object with the deposition of each layer during the three dimensional printing process. The thickness of the newly deposited sintered image may be reduced by raising the build surface 240 on which the object is constructed to compress the top layer of the object against the second heating pad 241B with a determined force. The object is generally held against the second heating pad 241B during the formation of the next layer, which is enough time for the curl forces to relax and or the layer thickness adjusted. As one skilled in the art will appreciate, the pressure sensing mechanism may also be used to dynamically control the drum to object gap, that is, the pressure sensing mechanism is used to determined the actual height of the object and therefore the distance that the build platform must be lowered to achieve the optimum gap before application of the next sintered layer.

In some embodiments, the 3DP 200 includes a layer processing surface other than a processing drum 310 to form an individual sintered layer. The layer processing surface may be, for example, a planar surface on which the sintered layer is formed before being pressed or otherwise stamped onto the work surface on the platform assembly.

In some embodiments, the drum 310 and sinterable powder bin 210 are provided as a removable and replaceable unit to enable the user to easily remove and replace or repair the unit. The sinterable powder bin 210 is preferably a sealed or tamper resistant container analogous to toner cartridges.

In a third preferred embodiment of the 3DP, the object is constructed from sintered images that are sintered in the build vat in which the object is constructed. The 3DP may further include a second vat (not shown), namely a powder vat the supplies powder to the assembly vat to build the object. Both vats are also heated to a temperature just below the melting point of the powder to, for example, reduce the amount of energy needed to melt the powder.

The height of the work surface in the build vat is held substantially level with the height of the powder in the powder vat to facilitate the distribution of powder to the build vat. In the preferred embodiment, the build vat is made to descend and the powder vat made to ascend in proportion to one another. The height of each of the vats is preferably controlled by a separate scissor lift operably coupled to a microprocessor. A powder roller is used to move a layer of powder from the powder vat to the build vat and distribute it with uniform thickness and density. The powder layers deposited in the build vat are approximately 5-20 mils in thickness. In the third preferred embodiment, the roller is attached to the same sinter assembly to take advantage of the existing actuators, although it may also be mounted to a separate control mechanism.

The sinter assembly preferably includes an inexpensive incoherent energy source adapted to provide focused heat to sinter the uppermost layer of powder in the build vat. The heat source preferably includes an elliptical reflector and or a Winston cone. As with the second embodiment, the sinter assembly may further use a mask with a hole for controlling the spot size of the beam, and a shutter for interrupting the beam. An example spot size in this example is approximately 30-70 mils. In contrast to the second embodiment, the focal point coincides with the upper most layer of sinterable powder in the build vat and the sintered image created by sweeping the sinter assembly across the width and length of the build vat in accordance with the associated cross-sectional layer of the model.

Illustrated in FIG. 9A-9E are cross sectional diagrams demonstrating the formation of an object using a partially sintered support structure. A partially sintered support structure as used herein refers to a laminar structure that is built of sinterable powder concurrently with the object being assembled to provide structural support, during assembly, for portions of the object that project or overhang with respect to the preceding layer of sintered powder. The partially sintered support structure may be used in the present invention and other rapid prototyping application where unimaged sinterable powder is removed from the work surface after the imaged layer is transferred to the previous layer of the object being assembled. A support structure generally comprises two portions including (1) a substantially rigid portion that is sintered with the same energy density as the object being assembled and (2) an interface portion sintered with less energy than the object to provide a detachable boundary between the rigid portion and object.

Figure 9A:
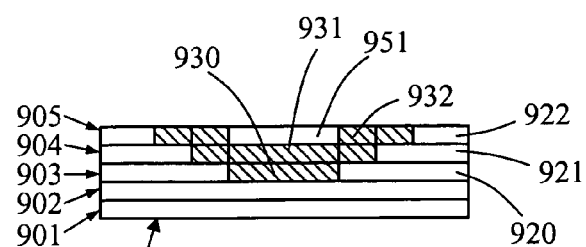
FIGS. 9A-9E are cross sectional diagrams demonstrating the formation of an object using a partially sintered support structure in accordance with an embodiment of the present invention.

Referring to an exemplary structure and object, shown in cross section FIG. 9A, the support structure 900 being assembled comprises a plurality of layers 901-905 of sintered powder which may include one or more layers 901-902 deposited before the first layer of the object. The third sintered image layer 903 is produced with a substantially rigid portion 920 as well as an interface portion 930 in proximity to the first sintered image layer 951 of the object being assembled. The fourth sintered image layer 904 is produced with a substantially rigid portion 921 and an interface portion 931 adjacent to the first sintered image layer 951 of the object. The fifth sintered image layer 905 includes a substantially rigid portion 922, an interface portion 932 as well as the first sintered image layer 951 of the object. The base layers 901-902 and substantially rigid portion 920-922 are fused with the same energy per unit area per unit time as the object being assembled including the first sintered image layer 951.

The interface portions 930-932 are fused with the less energy per unit area per unit time than the layers of the object. In the preferred embodiment, the interface portions 930-932 are sintered by subjecting sinterable powder in the region of the interface to the radiant energy source for a shorter period of time than the regions of the object and rigid portions. The radiant energy source may be made to traverse the drum and draw, i.e., sinter, the region of the interface at a rate that is 40 to 100 percent faster than the regions associated with the object, for example, thereby making the interface portion weaker than the part and support structure. In general, the particles of sinterable powder associated with the interface portion are fused to a lesser degree than the particles of the object or rigid portion, thereby giving rise to a difference in density that makes the interface relatively weak structurally.

Figure 9B:
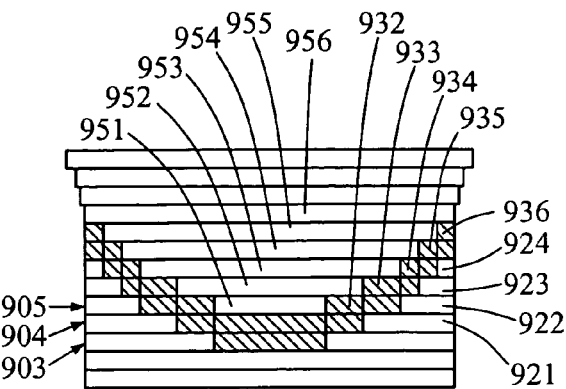
Figure 9C:
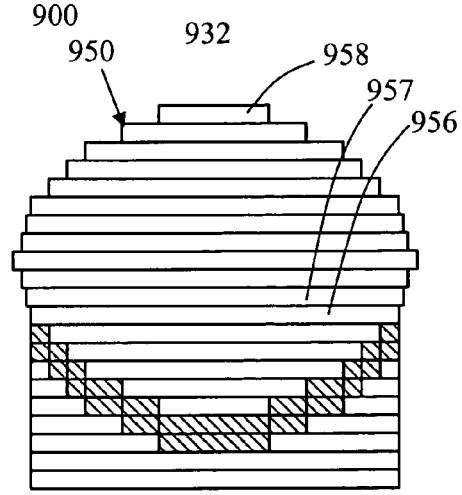
Figure 9D:
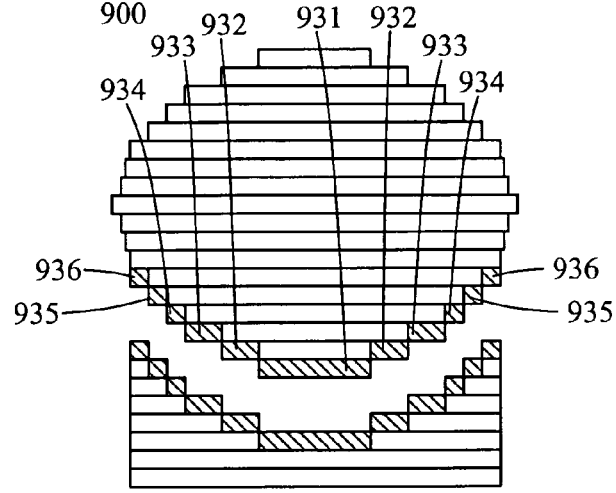
Figure 9E:
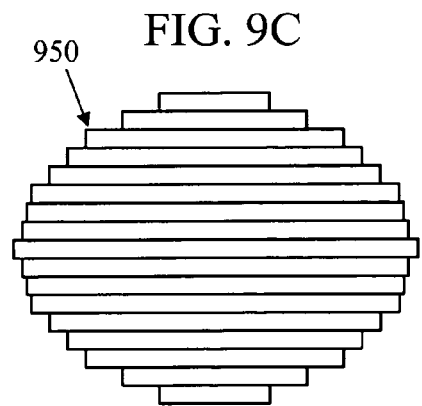

Referring to the cross section of FIG. 9B, the additional layers of the object and of the support structure 900 are concurrently imaged and transferred. The completed support structure 900 includes base layers 901-902, rigid portions 920-924, as well as interface portions 930-935. As illustrated, the rigid portions 920-924 and interface portions 930-935 are adapted to conform to the contours of the object being assembled, which is a sphere in the present example. In particular, the layers of the support structure 900 enable a layer of the object to be effectively transferred with little or no distortion even where the layer being transferred projects beyond or is cantilevered with respect to the preceding object layers, which is true of each of the object layers 951-956. Thereafter, the remaining layers 957-958 of the object are printed and transferred to the object being assembled (see FIG. 9C), the completed object 950 separated from the support structure 900 at a boundary defined by the interface portion 931-936 (see FIG. 9D), and the interface portion removed to reveal the completed object 950 (see FIG. 9E).

Figure 10A:
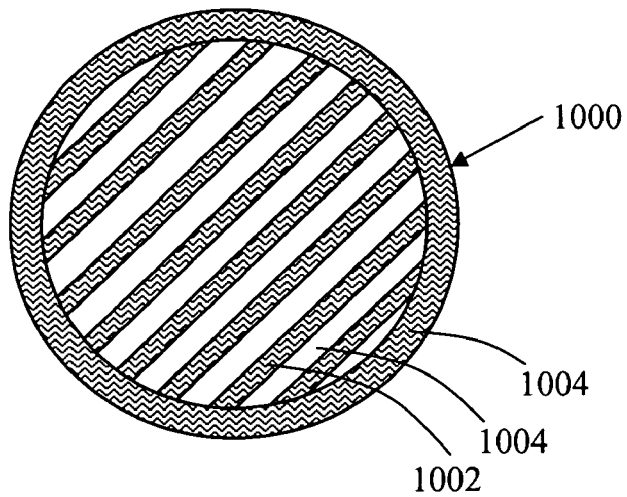
FIGS. 10A-10B are plan views of individual sintered images showing alternating open hatch patterns in accordance with an embodiment of the present invention.
Figure 10B:
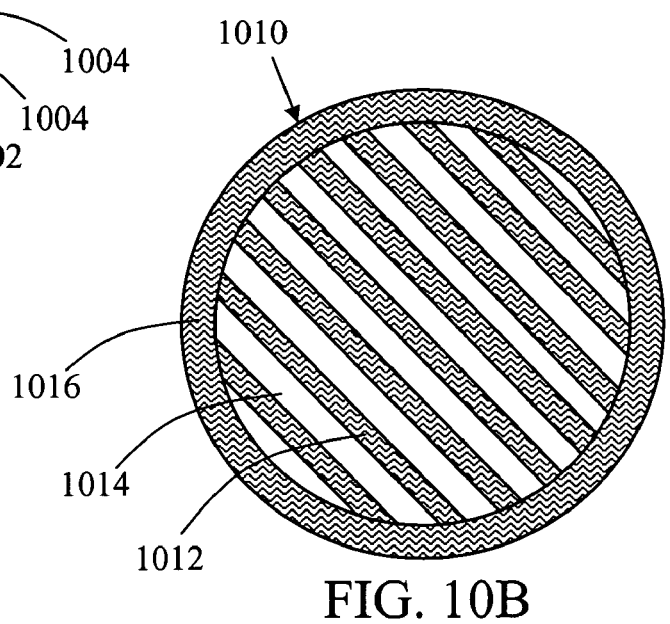
Figure 10C:
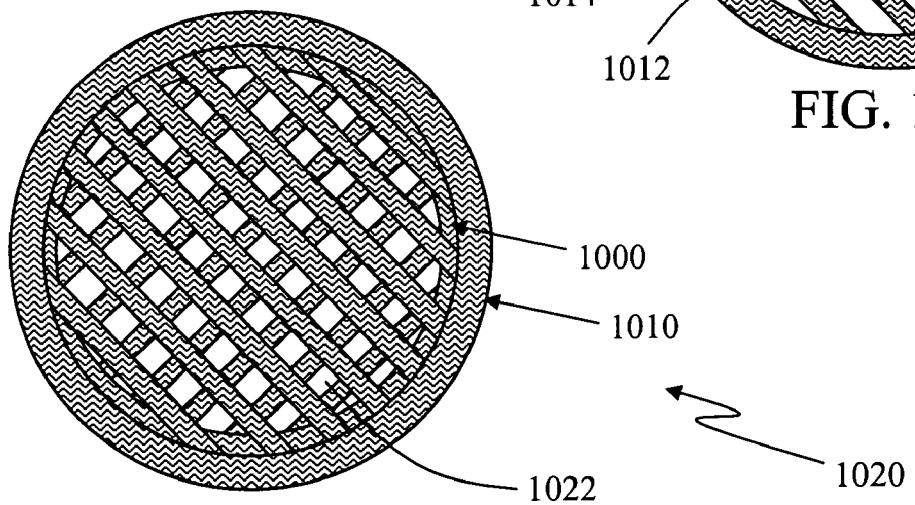
FIG. 10C is plan view of an object being assembled from a plurality of sintered images having alternating open hatch patterns in accordance with an embodiment of the present invention.

Referring to FIGS. 10A-10C, the object 950 of FIG. 9A-9E may be constructed from layers having optimized border and fill patterns to increase the build speed, reduce internal stresses that lead to dimensional inaccuracies, and make the part less brittle, i.e., more durable. In particular, the region within the border 106 of the sintered image 1000 is generated from a plurality of parallel sections of rigidly fused sintered powder 1002 separated by sections of unsintered powder 1004. The succeeding sintered image 1010 may have a border 1016 and an open fill pattern including parallel sections of rigidly fused sintered powder 1012 and sections of unsintered powder 1014 having an orientation rotated by 90 degrees with respect to the preceding layer. In the preferred embodiment, each of the parallel sections of rigidly fused sintered powder 1002 forming the fill pattern are preferably generated by selecting an aperture for the heat source to produce the largest spot size possible that the particular area of the image being sintered will allow. This will significantly reduce the time required to produce the image and therefore the object. The width and spacing of the parallel sections of rigidly fused sintered powder 1002, 1012 and the width of the borders 1004, 1014, may be determined by the feature size and geometry. For example, a smaller feature may require a smaller spot size for the border and fill, while the border and fill of a larger feature may be generated with a larger spot size alone. Similarly, a smaller spot size may be used to generate a small object while a large spot size is used to generate a large object. The border and fill patterns may also be further optimized for speed, strength, cooling, or to produce vias 1022 that allow unsintered powder to be evacuated from the object being assembled 1020 or after the build is completed.

Figure 11A:
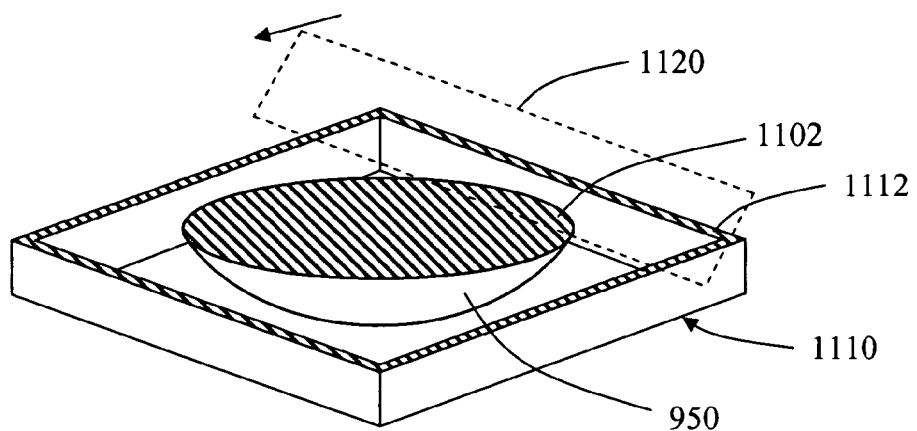
FIGS. 11A-11B are perspective views of an object being assembled within a layer thickness reference wall in accordance with an embodiment of the present invention.
Figure 11B:
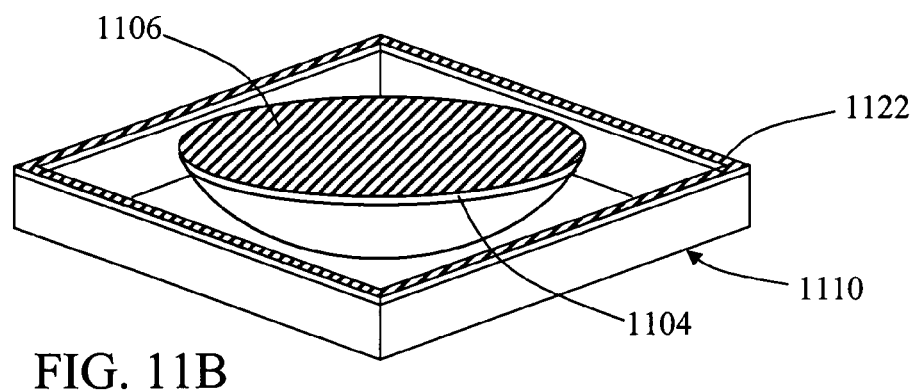

Illustrated in FIGS. 11A-11B is a layer thickness reference (LTR) wall 1110 used to accurately deposit and correct the height of the object being assembled. The wall 1110 is built layer by layer concurrently with the object 950 and is made from fully fused sintered powder. The height of the upper surface 1112, 1122 of the wall 1110 having a consistent geometry, is generally more uniform than the height of the object, which may become non-planar if minor errors in layer thickness are permitted to accumulate. The upper surface 1112 of the wall 1110 may therefore be used as a guide for a material removal mechanism, preferably a scraper blade 1120, also referred to as a doctor blade, that is passed across the object 950 to shave or otherwise remove high spots, thereby yielding a uniformly planar surface 1102 at a predetermined height. The subsequent sintered image 1104 and wall layer 1122 is then deposited and the scraper blade 1120 passed over the upper surface 1106 again to correct any non-uniformities. The process may be repeated for each layer of the object being assembled. Although the scraper blade 1120 requires as few as one or two sides of the wall 1110 parallel to the direction of travel, a wall that fully encircles the object being assemble further serves to retain unsintered powder for purposes of providing underlying support for subsequent sintered images.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A three-dimensional printer (3DP) adapted to generate an object assembled from a plurality of cross sections, comprising:
    a first surface configured to receive a bulk layer of sinterable powder;
    a radiant energy source configured to fuse a portion of the layer of sinterable powder an the first surface into an image, the image being a sintered image corresponding to one of said cross sections; and
    a transfer mechanism adapted to transfer the sintered image from the first surface to the object being assembled.
2. The 3DP of claim 1, wherein the first surface is a layer processing surface comprising a drum.
3. The 3DP of claim 1, wherein the first surface is a layer processing surface comprising a planar surface.
4. The 3DP of claim 1, wherein the radiant energy source comprises a heat source.
5. The 3DP of claim 4, wherein the heat source comprises a halogen lamp.
6. The 3DP of claim 4, wherein the heat source further comprises a reflector.
7. The 3DP of claim 4, wherein the heat source comprises an elliptical reflector.
8. The 3DP of claim 4, wherein the heat source further comprises one or more apertures adapted to concentrate energy from the heat source onto the first surface.
9. The 3DP of claim 1, wherein the sinterable powder comprises a polymer.
10. The 3DP of claim 9, wherein the polymer comprises nylon.
11. The 3DP of claim 1, wherein the sinterable powder layer is between 5-20 mils in thickness.
12. The 3DP of claim 1, wherein the 3DP further includes a platform assembly adapted to support the object being assembled.
13. The 3DP of claim 12, wherein the sintered image is transferred from the first surface to the object being assembled by simultaneously rolling the first surface and translating the first surface relative to the object being assembled.
14. The 3DP of claim 13, wherein a gap between the first surface and the object being assembled is less than or equal to a thickness of the layer of sinterable powder.
15. The 3DP of claim 12, wherein the platform assembly is further adapted to lower the build surface relative to the first surface after the layer of sintered image is deposited onto the object being assembled.
16. The 3DP of claim 2, wherein the 3DP further comprises a powder applicator adapted to apply the layer of sinterable powder to the drum.
17. The 3DP of claim 16, wherein the powder applicator comprises a layer control blade adjacent to the drum, wherein the angle between an interior angle between a face of the drum and the layer control blade is between 0 and 45 degrees.
18. The 3DP of claim 17, wherein the powder applicator comprises:
    a reservoir adapted to retain sinterable powder, and
    a conveyor adapted to dispense sinterable powder from the reservoir between the layer control blade and the drum.
19. The 3DP of claim 16, wherein the powder applicator causes the sinterable powder to free fall to the drum, wherein the density of the sinterable powder applied to the drum is substantially normalized.

20. The 3DP of claim 1, wherein the 3DP further comprises a first heating element adapted to hold the abject being assembled at a first predetermined temperature.

21. The 3DP of claim 1, wherein the 3DP further comprises a second heating element adapted to bold a work surface of the object being assembled at a second determined temperature and pressure during assembly of the object.

22. The 3DP of claim 21, wherein the second determined temperature is substantially equal to but less than a melting temperature of the sinterable powder.

23. The 3DP of claim 22, wherein the second heating element comprises a planar surface adapted to:
contact the work surface before the sintered image is transferred to the object being assembled, and
retract when the sintered image is transferred to the object being assembled.

24. The 3DP of claim 23, wherein the work surface is a preceding sintered image transferred before said sintered image.

25. The 3DP of claim 1, wherein the transfer mechanism comprises a transfixing heater adapted to fuse the sintered image to the abject being assembled, wherein the transfixing heater is in proximity to the sintered image and the object being assembled.

26. The 3DP of claim 25, wherein the transfixing heater is parallel to and moves with the first surface.

27. The 3DP of claim 1, wherein the 3DP further comprises a layer thickness control processor adapted to regulate the thickness of a sintered layer fused to the object being assembled.

28. The 3DP of claim 27, wherein the layer thickness control processor is adapted to regulate a quantity of sinterable powder dispensed by an applicator.

29. The 3DP of claim 27, wherein the layer thickness control processor is adapted to regulate a position of a blade with respect to the first surface.

30. The 3DP of claim 27, wherein the layer thickness control processor is adapted to regulate the time and pressure used to transfer the sintered image to the object being assembled.

31. The 3DP of claim 27, wherein the 3DP further comprises a mechanism to determine a height of the object being assembled, and wherein the layer thickness control processor is adapted to compress the object being assembled based on the determined height.

32. The 3DP of claim 1, wherein the 3DP further comprises means for cleaning the first surface after the sintered image is transferred to the object being assembled.

33. The 3DP of claim 32, wherein the means for cleaning the first surface is selected from the group consisting of: a scraper, a brush, vacuum, blower and a corona wire.

34. The 3DP of claim 1, wherein the 3DP further comprises means for cleaning a work surface of the object being assembled.

35. The 3DP of claim 34, wherein the means for cleaning the work surface is selected from the group consisting of a rotary brush, a vacuum, a blower and a corona wire for drawing powder off the work surface using electrostatic attraction.

36. The 3DP of claim 1, wherein the 3DP further comprises object cooling means adapted to accelerate cooling of the sintered image fused to the object being assembled.

37. The 3DP of claim 1, wherein the first surface comprises a temperature regulator and heating clement adapted to heat the temperature of the first surface substantially equal to and less than a fusing point of the sinterable powder.

38. The 3DP of claim 8, wherein the size of at least one of the one or more apertures is adjustable.

39. The 3DP of claim 4, wherein the beat source is adapted to select one of a plurality of apertures, wherein each of the apertures is adapted to concentrate energy from the radiant energy source onto the first surface with a different spot size.

40. The 3DP of claim 1, wherein the transfer mechanism is further adapted to fuse the sintered image to the object being assembled.

41. The 3DP of claim 40, wherein the transfer mechanism is adapted to concurrently transfer the sintered image from the first surface and fuse the sintered image to the object being assembled.

42. The 3DP of claim 1 further adapted to deposit unsintered powder from the first surface onto the object being assembled to provide support for a subsequent sintered image.

43. The 3DP of claim 1, wherein the first surface comprises a continuous surface of anodized aluminum.

44. The 3DP of claim 1, wherein die 3DP is adapted to fuse the sintered image on the first surface with each of a plurality of spot sizes based on a size of an object feature, the plurality of spot sizes comprising a first spot size for fusing a first portion of the sintered image and a second spot size for fusing a second portion of the sintered image, and wherein the first spot size is different than the second spot size.

45. The 3DP of claim 1, wherein 3DP is adapted to fuse each of a plurality of sintered images of the object with one of a plurality of spot sizes.

46. A three-dimensional printer (3DP) adapted to generate an object assembled from a plurality of cross sections, comprising:
a drum adapted to receive a bulk layer consisting of sinterable powder;
a powder applicator adapted to:
dispense sinterable powder in bulk to the drum, and
normalize the density of sinterable powder dispensed to the drum;
an incoherent energy source is adapted to focus the energy and fuse at least a portion of the bulk layer of sinterable powder on the drum into a sintered image, the sintered image corresponding to one of said cross sections;
a transfer mechanism adapted to concurrently:
transfer the sintered image from the drum to the object being assembled, and
fuse the sintered image to the object being assembled;
a first heating element adapted to hold the object being assembled at a first predetermined temperature; and
a second heating element adapted to hold a surface of the object being assembled at a second determined temperature during assembly of the object.

47. A method of generating an object assembled from a plurality of cross sections, the method comprising the steps of:
generating a layer comprising sinterable powder on a first surface, wherein the layer comprises a bulk layer of sinterable powder from which one or more of said cross sections is imaged;
generating a sintered image using a radiant energy source configured to fuse at least a portion of the layer of sinterable powder while on the first surface; and
transferring the sintered image from the first surface to the object being assembled.

48. The method of claim 47, wherein the method further comprises the step of:

adhering the sintered image to the object being assembled concurrently with transferring the sintered image from the first surface to the object being assembled.

49. The method of claim 47, wherein the sinterable powder comprises a polymer.

50. The method of claim 49, wherein the polymer is selected from the group consisting of: nylon 11 and nylon 12.

51. A three-dimensional printer (3DP) adapted to generate an object assembled from a plurality of crass sections, comprising:
   a first surface configured to receive a layer of sinterable powder;
   a focused radiant energy source configured to selectively fuse a portion of the layer of sinterable powder on the first surface into a sintered image, the sintered image corresponding to one of said cross sections; and
   a transfer mechanism adapted to transfer the sintered image from the first surface to the object being assembled.

52. The 3DP of claim 51, wherein the layer of sinterable powder on the first surface is a bulk layer of sinterable powder from which the corresponding one of said cross sections is imaged.

53. The 3DP of claim 1, wherein the transfer mechanism is configured to directly transfer the sintered image from the first surface to the object being assembled.

* * * * *